(12) United States Patent
Vuillaume et al.

(10) Patent No.: US 8,374,345 B2
(45) Date of Patent: Feb. 12, 2013

(54) DATA PROCESSING SYSTEM AND DATA PROCESSING METHOD

(75) Inventors: Camille Vuillaume, Tokyo (JP); Katsuyuki Okeya, Sagamihara (JP); Masayuki Yoshino, Yokohama (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 997 days.

(21) Appl. No.: 12/366,679

(22) Filed: Feb. 6, 2009

(65) Prior Publication Data
US 2009/0245507 A1  Oct. 1, 2009

(30) Foreign Application Priority Data
Mar. 21, 2008  (JP) .................................. 2008-072723

(51) Int. Cl.
*G06F 21/00* (2006.01)
(52) U.S. Cl. ............................................. 380/44
(58) Field of Classification Search .................... 380/44, 380/277
See application file for complete search history.

(56) References Cited

U.S. PATENT DOCUMENTS

| 7,113,595 | B2 | 9/2006 | Joye et al. | |
|---|---|---|---|---|
| 2002/0186837 | A1 | 12/2002 | Hopkins et al. | |
| 2003/0235299 | A1 | 12/2003 | Dupaquis | |
| 2004/0119614 | A1* | 6/2004 | Joye | 341/50 |
| 2005/0027764 | A1* | 2/2005 | Agrawal et al. | 708/250 |
| 2009/0003594 | A1* | 1/2009 | Ozturk et al. | 380/30 |
| 2009/0003596 | A1* | 1/2009 | Ozturk et al. | 380/30 |

FOREIGN PATENT DOCUMENTS
DE      103 57 749 A1    7/2005

OTHER PUBLICATIONS

Alfred Menezes et al., "Handbook of Applied Cryptography", Chapter 4, Public-Key Parameters. CRC Press, ISBN 0-8493-8523-7, pp. 134-139 and 144-149, CRC Press 1997.
Katsuyuki Okeya et al., "Signed Binary Representations Revisited", Proceedings of Advances in Cryptology, CRYPTO 2004, LNCS 3152, pp. 123-129 and 134-139, Springer-Verlag, 2004.
Moeller, "Improved Techniques for Fast Exponentiation", Lnaiadvances in Artificial Intelligence, Nov. 2002, pp. 298-312, vol. 2587, 28.
Partial European Search Report issued in European Application No. EP09250320.0 on Jul. 12, 2011.
Bruce Schneier, "Applied Cryptography," Applied Crytography, Protocols, Algorithms, and Source Code in C, John Wiley & Sons, Inc., New York, Jan. 1, 1996, pp. 353-354, ISBN: 978-0-471-11709-4, XP008041666.
Sol Weintraub, "On Storing and Analyzing Large Strings of Primes," The Fibonacci Quarterly, vol. 11, No. 4, Nov. 30, 1973, pp. 438-440, available at http://www.fq.math.ca/11-4.html.
Extended European Search Report (including search opinion) issued in European Application No. EP09250320.0 on Jan. 12, 2012.

* cited by examiner

*Primary Examiner* — Jason Gee
(74) *Attorney, Agent, or Firm* — Miles & Stockbridge P.C.

(57) ABSTRACT

A technique for efficient encryption for use with devices such as smartcards restricted in memory resource, including a calculation unit for reconstructing a large number of small primes, a sieving unit for checking the divisibility of an integer by small primes, a recoding unit for changing the representation of an integer, and a primality testing unit. The sieving unit eliminates "bad" candidates by checking their divisibility by small primes reconstructed by the calculation unit. The primality of the remaining candidates is tested using the primality testing unit. The primality testing unit uses the recoding unit to change the representation of prime candidates. The primality testing unit performs a primality test using the representation after change.

5 Claims, 14 Drawing Sheets

DATA PROCESSING SYSTEM AND DATA PROCESSING METHOD

CLAIM OF PRIORITY

The Present application claims priority from Japanese application JP 2008-072723 filed on Mar. 21, 2007, the content of which is hereby incorporated by reference into this application.

BACKGROUND

The present invention relates to a data processing system and data processing method for primality checking, and particularly to a technique useful in the efficient generation of cryptographic keys to be used in e.g. the framework of a public key cryptosystem.

Public key cryptosystems have gained a wide recognition, and are now commonly used in many applications, such as banking or electronic commerce, where they can be used to digitally sign documents, encrypt data, exchange keys between users communicating over insecure network and others. RSA is a de-facto standard for public key cryptography, and has gained widespread popularity in applications where a digital signature or public key encryption are required. For instance, the use of RSA is recommended by the EMV (Europay-Mastercard-Visa) consortium for credit cards. More precisely, EMV recommends RSA with a key length of 1024 bits until 2010, and 2048-bit keys after that.

In RSA, messages are encoded as n-bit integers. An RSA public key consists of a public exponent E, which is typically small, and an n-bit public modulus N, and the RSA private key is an n-bit integer D such that $E*D=1 \bmod (P-1)*(Q-1)$, where P and Q are secret prime numbers satisfying $P*Q=N$, and the sign "*" denotes multiplication. Now, for any message such that $0<=M<N$, $(M^E)^D \bmod N=M$ holds. For example, if Alice is a holder of the RSA key (E,N), D, and Bob whishes to send an encrypted message M to Alice, Bob computes $C=M^E \bmod N$, and sends the ciphertext to Alice. Then, Alice computes $C^D=(M^E)^D=M \bmod N$ and recovers the plaintext. It can be seen that the core operation in RSA is the exponentiation $X^Y \bmod N$. When N is large, for instance 2048 bits, such exponentiation takes time. In order to accelerate RSA operations, one can take advantage of the Chinese Remainder Theorem, which states that the exponentiation $C^D \bmod N$ can be replaced with two exponentiations modulo P and modulo Q. Since $N=P*Q$ and P and Q have about half the size of the modulus N, the Chinese Remainder Theorem approach (RSA-CRT) is much faster in practice. In RSA-CRT, the encryption procedure is the same as in standard RSA: $C=M^E \bmod N$. The difference is in the decryption procedure. The following definitions are given, for example:

$D_P = D \bmod P-1 = E^{-1} \bmod P-1$, $D_Q = D \bmod Q-1 = E^{-1} \bmod Q-1$, and $Q_{inv} = Q^{-1} \bmod P$, where $Z=X^{-1} \bmod Y$ is an integer $1<=Z<Y$ satisfying $Z*X=1 \bmod Y$. Then, RSA-CRT decryption is executed by computer as follows:

$M_P = C^{D_P} \bmod P$, $M_Q = C^{D_Q} \bmod Q$, and $M = M_Q + Q*[Q_{inv}*(M_P-M_Q) \bmod P]$.

Therefore, the keypair of RSA consists of:
the public key (E,N),
the private key D for standard RSA, and (P, Q, $D_P$, $D_Q$, $Q_{inv}$) for RSA-CRT.

The length of an RSA key depends on the number of bits of the public modulus N. For example, in 2048-bit RSA, the public modulus N has 2048 bits, and generally, the two primes P and Q each have 1024 bits, so that $N=P*Q$. In order to issue RSA keys, two random primes P and Q are selected, and other key elements are derived from the two primes. A step for generating a random prime proceeds as follows. First, a random integer is selected, and then this random number is tested for primality, for example with the Fermat test. If the random number does not pass the primality test, it is updated with a new prime candidate. How to update differs from one method to the other; for example, the first random integer may be replaced with a new random integer, or alternatively it can be incremented. The step of generating random primes is the most computationally expensive task in generation of RSA keys.

In the past, RSA key generation in smartcards was out of question because their computing power was too low to handle such costly operations. As a consequence, RSA keys were calculated on a powerful workstation, and copied on the smartcard. However, recent smartcards benefit from hardware accelerators dedicated to public key cryptography; with these cryptographic coprocessors, it becomes practical to generate keys in smartcards. This approach has two advantages. The first one is that there is no single point of failure, unlike the case where keys were generated on a workstation: if the workstation is compromised, all generated keys are consequently put in danger. The second advantage is that the card issuer need not know the secret key. In case of dispute, the card issuer cannot be regarded to be responsible for leaking secret keys or misusing them.

SUMMARY OF THE INVENTION

Even when computations are assisted by cryptographic coprocessors, in many cases, portable devices such as smartcards are highly constrained environments with low computational power and scarce storage resources. However, end users are not willing to wait for a long time when cryptographic keys are generated. Therefore, there has been a strong incentive for inventing a technique for generating such keys efficiently without the need for many computer resources.

In Alfred Menezes, "Handbook of Applied Cryptography", Chapter 4, Public-Key Parameters. CRC Press, ISBN 0-8493-8523-7 (Reference 1), several well-known methods for generating random prime numbers are described. However, such techniques can hardly be implemented on smartcards owing to their scarce memory resources.

In Marc Joye, "Method for rapidly generating a random number that cannot be divided by a predetermined set of prime numbers", U.S. Pat. No. 7,113,595, 2002 (Reference 2), a compact method for generating random prime numbers is described in detail. However, this method is less efficient than the fastest known techniques.

The invention was made in consideration of the circumstances as described above. Therefore, it is an object of the invention to provide a primality-test technique which contributes to materialization of an efficient encryption even in devices such as smartcards restricted in memory resource.

Besides, it is an object of the invention to provide a technique which enables high-speed generation of random prime numbers even with portable devices having scarce memory resources.

Further the above and other objects and novel features will become apparent from the ensuing description and accompanying drawings.

Of the embodiments herein disclosed, preferred ones will be briefly outlined below.

The present invention is applied to data encoding and recoding in order to enable efficient processing with a smaller number of computer resources. In particular, compact predetermined tables are used for re-generating a large number of small prime integers during the prime number generation step. In addition, prime candidates which are processed by the primality test are recoded, and are changed in their representation form from the binary code to suitable one.

The data processing system for generating cryptographic keys includes: a calculation unit for re-generating a large number of small primes; a sieving unit for checking the divisibility of an integer by small primes; a recoding unit for changing the representation of an integer; and a primality testing unit.

The sieving unit first checks the divisibility of an integer by small primes re-generated by the calculation unit thereby to remove an "inadequate" prime candidate. After that, the remaining prime candidates are tested by the primality testing unit. At that time, the recoding unit is used to change the representation of the prime candidates, and the primality testing unit performs the primality test using the resultant representation. Thus, the number of operations for the primality test can be decreased without further memory requirements.

Now, the effects attained by the preferred embodiments will be described below briefly.

The invention contributes to materialization of efficient encryption in the primality test and generation of prime numbers even in devices such as smartcards with restricted memory resource.

Further, even with scarce memory resources as in portable devices, random prime numbers can be generated at a high speed.

These and other benefits are described throughout the present specification. A further understanding of the nature and advantages of the invention may be realized by reference to the remaining portions of the specification and the attached drawings.

DETAILED DESCRIPTION OF THE EMBODIMENTS

Definitions and Notations

First, definitions and notations used below will be described. Uppercase variables such as A or B denote large integers; for example 1024-bit integers. Lowercase variables such as x or y refer to small integers with a bit length typically smaller than 32 bits.

$R=A*B \mod N$ is a classical modular multiplication, where $P=A*B$ is the usual multiplication, and R is the remainder of the division P/N. In other words, R is an integer which meets $0<=R<N$ and $R+Q*N=A*B$ for some integer Q.

$A^D \mod N$ is a modular exponentiation, corresponding to $A*A*\ldots*A \mod N$, with D−1 modular multiplications. We sometimes write $A^{\wedge}D \mod N$ as well. The sign "^" denotes exponentiation or involution.

gcd(A,B) is the greatest common divisor of A and B. For instance, 3 is the greatest common divisor of 6 and 15, because $6=3*2$ and $15=3*5$.

$A^{-1} \mod N$ refers to an integer B which meets the condition $A*B=1 \mod N$. B exists if gcd(A,N)=1.

A prime number is an integer which has exactly two distinct divisors, namely itself and 1. For instance, the integers 2, 3, 5, 7, 11 are prime numbers.

A composite integer (or composite number) is an integer which can be factorized into at least two prime factors. 21 is a composite integer since $21=3*7$, and 4 is a composite integer since $4=2*2$.

MontMult(A,B,N) is a Montgomery multiplication, which is equivalent to the modular multiplication $A*B*2^{-n} \mod N$ with an n-bit modulus N.

First Embodiment

First, presented is the description focusing on the circuit for prime generation.

Smartcard

Figure 1:
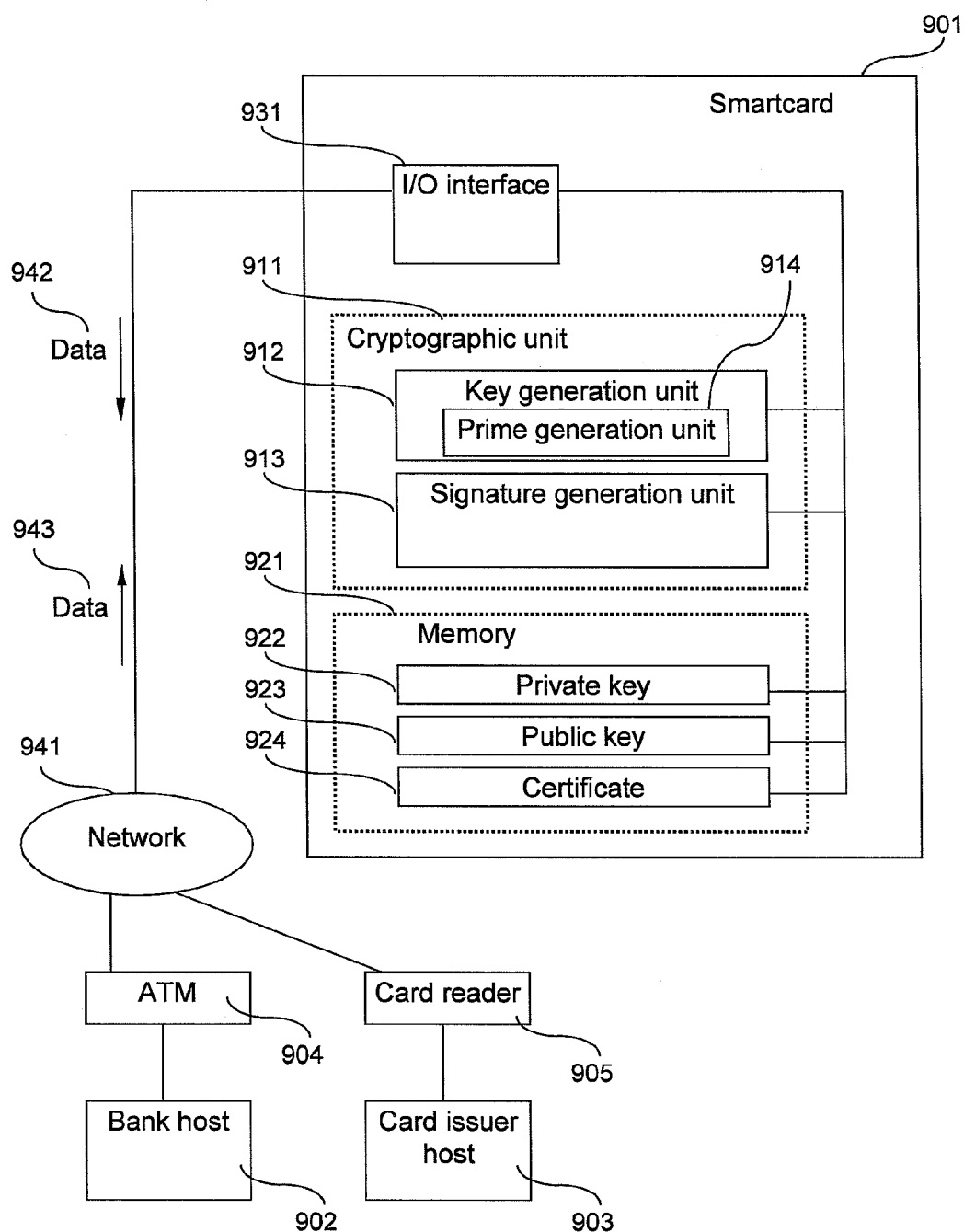
FIG. 1 is a block diagram of the smartcard.

FIG. 1 presents a block diagram of the smartcard. The smartcard 901 is equipped with at least the following components: an input/output interface 931; and cryptographic units 911, including a key generation unit 912 and a signature generation unit 913; and a memory 921 for storing at least a private key 922, a public key 923 and a digital certificate 924.

Although no special restriction is intended, it is assumed in this embodiment that the cryptographic unit 911 is composed of hardware logic.

In this embodiment, the smartcard can be coupled through a communication network 941 with e.g. an ATM 904 and a smartcard reader 905; the ATM 904 is coupled with a bank's host system (bank host) 902, and the smartcard reader 905 is coupled with a card issuer's host system (card issuer host) 903. The reference numeral 942 represents data sent from the smartcard 901 to the network 941, and 943 denotes data which the smartcard receives through the network 941.

It has been shown that it is advantageous to generate the cryptographic keys directly on the smartcard 901 if the smartcard 901 implements digital signatures with the de-facto standard RSA. To realize this, the key generation unit 912 can take advantage of a prime generation unit 914, which is a dedicated circuit for generating prime integers. Generation of prime integers is the costliest part in RSA keypair generation in terms of data processing. Therefore, the prime generation unit 914 is intended to reduce the cost.

Action of the Smartcard

Figure 2:
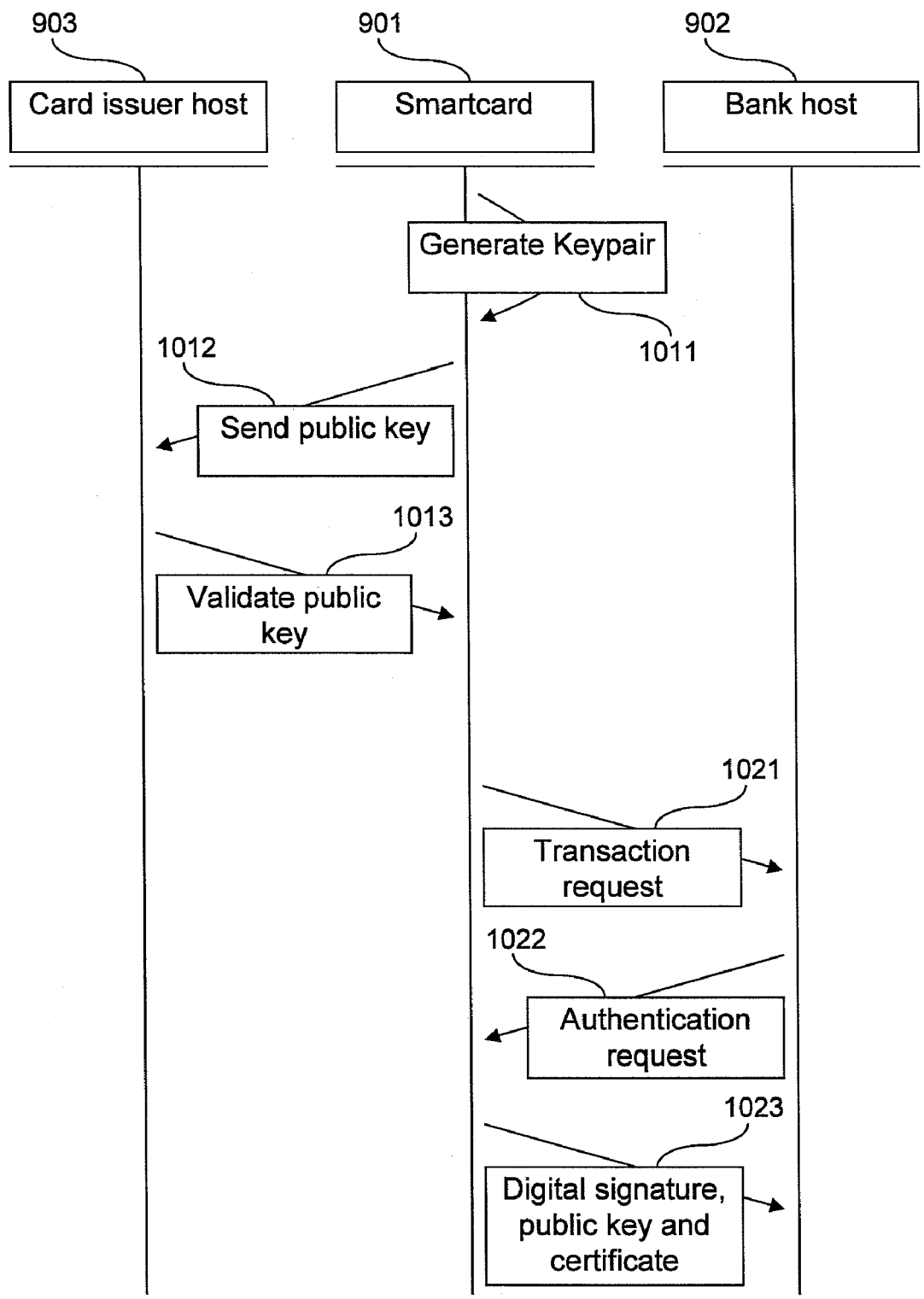
FIG. 2 is a timing chart showing examples of typical operation steps of RSA-enabled smartcard.

FIG. 2 represents the typical actions of an RSA-enabled smartcard 902 when in use. First, the RSA keys are generated in the smartcard 901 in Step 1011. RSA keys consist of the private key 922 and the public key 923, stored in the memory 921. After that, the smartcard 901 sends the public key 923 to the card issuer host 903 in Step 1012. Then, a digital certificate 924 is issued, whereby the public key is validated. The certificate 924 is sent back to the smartcard in Step 1013, and stored in the memory 921.

RSA keys must be generated at least before the first authentication action by the smartcard, and possibly after the validity date of the digital certificate 924 is expired. When the certificate 924 is valid, the smartcard can be used as an authenticated token card (authentication token). The smartcard sends a transaction request to the bank host 902 in Step 1021. Then, the bank host issues an authentication request in response to it in Step 1022. In Step 1023, the smartcard 901 generates a digital signature using the signature generation unit 913 and its private key 922, and sends the digital signature, its public key 923 and the digital certificate 924 issued by the card issuer host 903. If the signature and certificate are valid, authentication will be granted by the bank host 902. Steps 1021 to 1023 can be performed as many times as required while the certificate is valid, which allows for a practically unlimited number of digital transactions.

Prime Generation Unit

Figure 3:
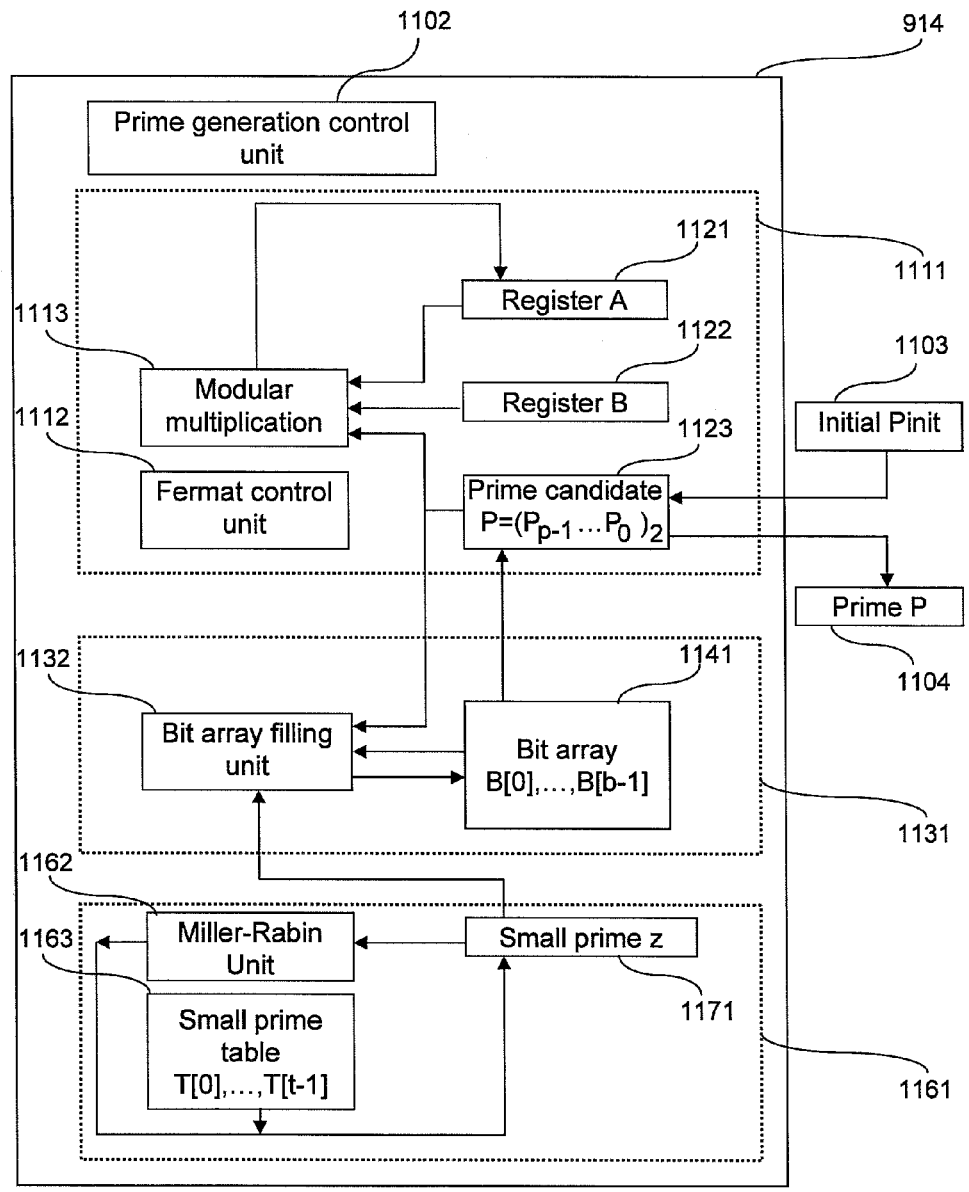
FIG. 3 is a block diagram showing an example of the prime generation unit.

FIG. 3 shows a specific example of the prime generation unit 914. The key generation unit 912 of FIG. 1 has a prime generation unit 914 for generating prime integers P and Q, provided that the public modulus N is equal to P*Q. For generating a prime P (or Q), the prime generation unit 914 takes an initial random candidate $P_{init}$ and finds the first prime P greater than $P_{init}$. The prime generation unit 914 has three sub-units: a Fermat test unit 1111, a bit array unit 1131 and a small prime generation unit 1161, which are activated and controlled by the prime generation control unit 1102. The prime generation control unit 1102 is to be described later with reference to FIG. 4.

The Fermat test unit 1111 verifies the primality of a prime candidate. The Fermat test unit 1111 has three memory registers: one register for storing a prime candidate P 1123, a register A 1121 and a register B 1122. The three registers are coupled to a modular multiplication unit 1113, which computes A*B mod P (or A*A mod P) and stores the result back in the register A 1121. In this embodiment, the size of the registers A, B and the resister for storing P is limited to 1024 bits. As a consequence, the generated prime integers have at most 1024 bits.

The Fermat test control unit 1102 activates the modular multiplication unit 1113, routes signals to the modular multiplication unit 1113, and has the unit 113 execute the Fermat test and decide on the primality of the prime candidate P 1123. This function is to be described later in detail with reference to FIG. 5.

The bit array unit 1131 contains a bit array 1141, which consists of b bits of B[0], . . . , B[b−1]. In the bit array unit 1141, each bit B[i] represents a prime candidate $P_{init}+2i$.

Figure 7:
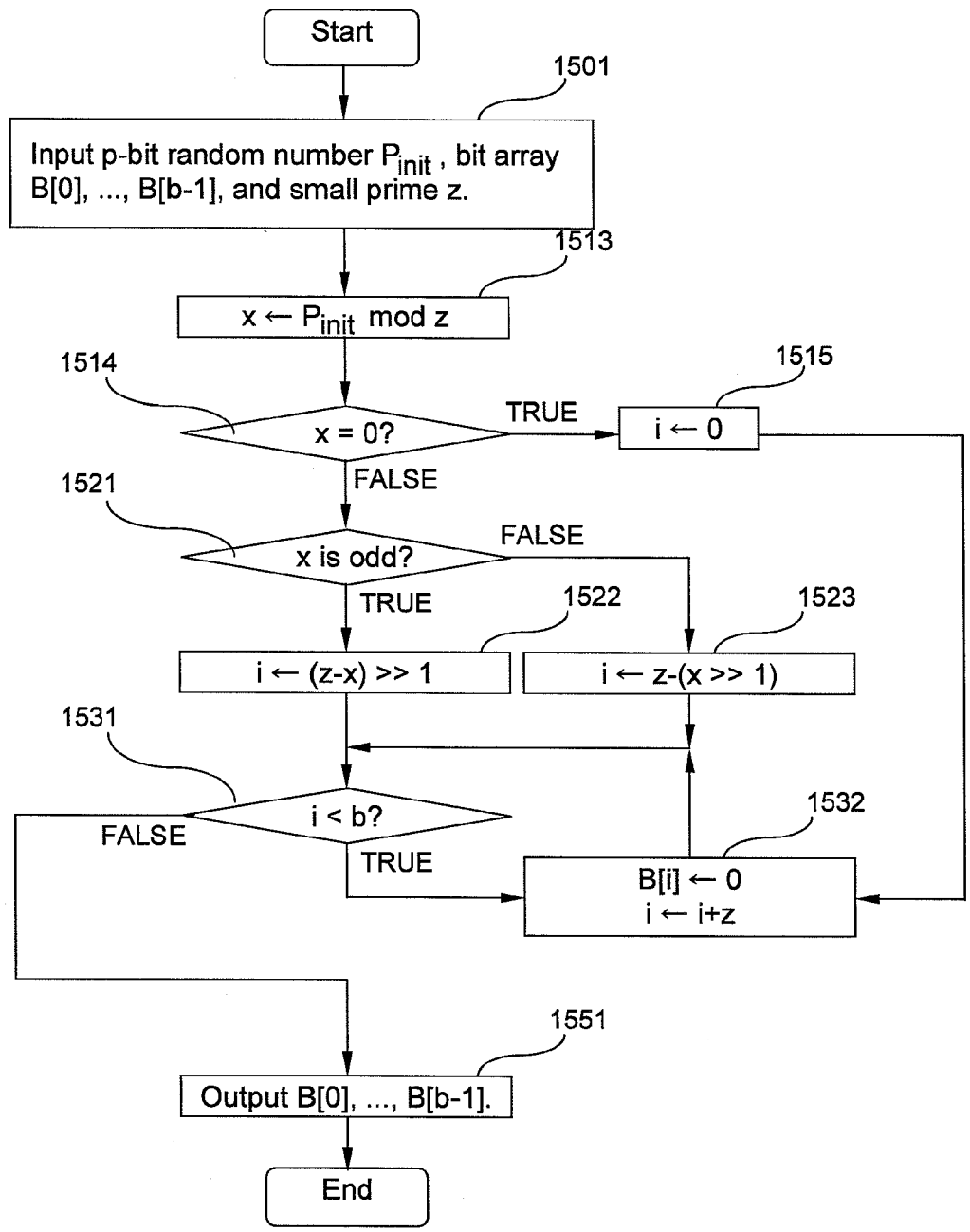
FIG. 7 is a flowchart for explanation of the data-update function of the bit array.

If B[i]=0, $P_{init}+2i$ is a "bad" candidate and is rejected. However, if B[i]=1, $P_{init}+2i$ is a "good" candidate and should be further tested with the Fermat test unit 1111. The bit array is filled by the bit array filling unit 1132. The bit array filling unit 1132 takes the initial prime candidate $P_{init}$ and a small prime as input, and writes zero at appropriate locations of the bit array. The bit array filling unit 1132 is to be described later in detail with reference to FIG. 7.

The small prime generation unit 1161 generates small prime integers with less than 16 bits, which can be used in order to discriminate an inadequate integer. The small prime generation unit 1161 contains a small prime table 1163 storing the first t small primes, but can generate more than t primes thanks to its Miller-Rabin unit 1162. The function thereof is to be described later in detail with reference to FIG. 6. The generated small prime is stored in a 16-bit memory register 1171.

Prime Generation Control Unit

Figure 4:
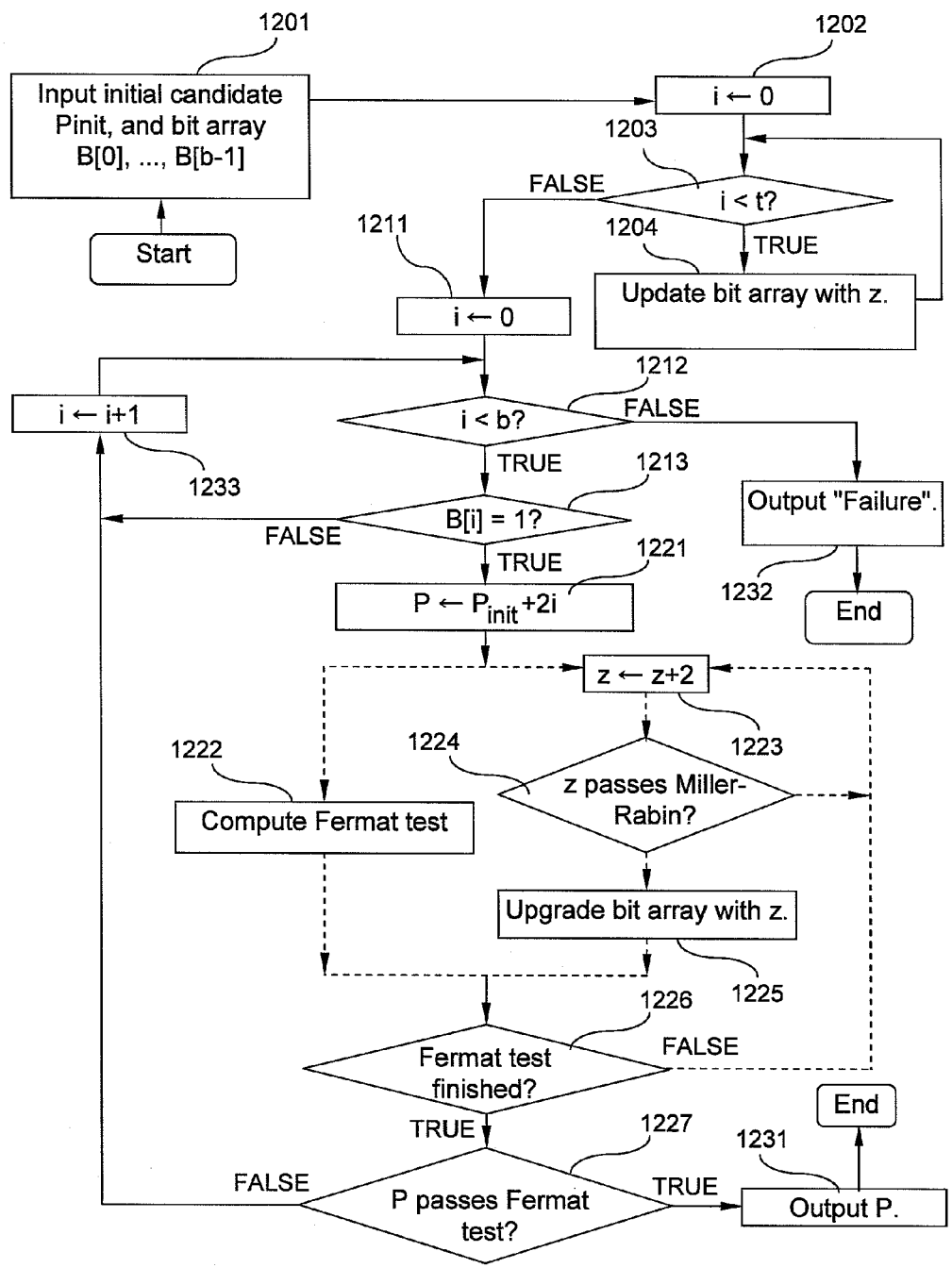
FIG. 4 is a flowchart showing, in detail, examples of operation steps of the prime generation control unit.

Details of the prime generation control unit 1102 are exemplified with reference to FIG. 4. The initial candidate $P_{init}$ is copied in register P 1123, and initially the bit array B[0], . . . , B[b−1] is all set to 1. In Steps 1202, 1203 and 1204, the bit array is initialized with the first t primes stored in table T 1163. More precisely, in Step 1204, one small prime z is extracted from the table T and copied to the small prime register 1171. Then, the bit array filling unit 1132 uses the small prime z to update the bit array 1141 and write 0 at adequate positions, thereby eliminating bad candidates. The bit array filling unit is to be described later in detail with reference to FIG. 7.

After the bit array has been initialized using small primes from the table T 1163, the prime generation control unit inspects the bit array 1141 and looks for an index i such that the corresponding entry B[i] contains 1 in Step 1213. Such entry refers to an integer $P_{init}+2i$ which is a "good" candidate and must be further tested with the Fermat test unit 1111. Thus, the value $P_{init}+2i$ is written to the register P 1123 in Step 1221, and is targeted for the Fermat test in Step 1222. The function of the Fermat test control unit is to be described with reference to FIG. 5.

However, because of hardware size limitations, the table T does not contain many small primes, and as a consequence, the bit array still has many entries with B[i]=1, and the Fermat test should be called many times before a prime integer P is found. In order to reduce the number of calls to the Fermat test and accelerate prime generation, when the Fermat test unit is enabled in Step 1222, in the same time, a new small prime z is generated, and the bit array is updated with the new small prime. As a consequence, more entries are cleared to 0 in the bit array and the number of calls to the Fermat test is decreased.

Steps 1223, 1224 and 1225 generate such new small prime z and update the bit array with z, which are performed by the small prime generation unit 1161 and the bit array unit 1131, and are executed in parallel with the Fermat test. In FIG. 4, such parallel computations are represented with dotted arrows.

In Step 1223, the small prime z of the 16-bit register 1171 is updated with z+2; indeed, z is odd, and even integers are obviously not prime integers since they are divisible by 2. Next, z is tested for primality using the Miller-Rabin unit 1162. The function of the Miller-Rabin unit is to be described in detail with reference to FIG. 6. The Miller-Rabin unit is a circuit dedicated for testing 16-bit integers for primality, and is therefore much faster than the Fermat test unit, which is designed for handling much larger integers. As a consequence, many Miller-Rabin tests can be computed while one Fermat test is being executed. When a small 16-bit prime is found in the Miller-Rabin test unit, the bit array 1141 is updated by the bit array filling unit 1132 in Step 1225. These three Steps 1223, 1224 and 1225 are repeated as long as the Fermat test is running.

When the Fermat test is finished and has been successful, the probable prime P is returned in Step 1231 by the prime generation unit; otherwise, the prime generation unit looks for another good candidate in the bit array, by incrementing the active index of the bit array 1233 and starting again from Step 1212. When all indices in the bit array have been scanned and no prime has been found, the prime generation unit returns "failure" in Step 1232.

Fermat Test

Now, the Fermat test will be described. The Fermat test takes a base B and a prime candidate P as input, and computes the exponentiation $B^{P-1}$ mod P. If the result is not 1, then the candidate P is a composite integer; if the result is 1, then the candidate P is probably a prime integer. Since the exponentiation $B^{P-1}$ mod P is an expensive operation, and even when many "bad" candidates in the bit array are eliminated, many "good" candidates which must be tested with the Fermat test are still left. In this respect, improvement of processing speed in the Fermat test is very attractive.

A well-known method for improving the performance of exponentiations is to use a window method. In a window method with window size w, w bits from the exponent are scanned simultaneously. In other words, the exponent, which is usually stored in its binary representation in a memory unit, is recoded in base $2^w$. The w bits represent an integer j on condition that $0<=j<2^w$. The data $B^j$ mod P is precomputed, and then the window exponentiation technique computes consecutive squares $A^2$ mod P and only one multiplication $A*B^j$ mod P. When the standard binary method is used instead, for w bits of the exponent, the operations $A^2$ are not affected, but additional w/2 multiplications are required. Therefore, the window method considerably decreases the number of multiplications.

However, the precomputed values required by the window method must be stored in RAM. With respect to smartcards, RAM is limited. Further, in the case of a 1024-bit exponentiation, one precomputed value occupies 128 bytes, and optimized window methods often use dozens of such precomputed values. This is not practical for smartcards.

For instance, with a window size w=5, about 4 kilobytes of RAM are occupied by precomputed values.

The Fermat test in connection with the invention can take advantage of a window method with a large window without any memory requirement for precomputations. In the Fermat test, it is common to use a special base for B in the exponentiation $B^{P-1}$ mod P and especially B=2. In that case, even for a large w, there is no need to precompute or store the values $B^j$ mod P. Suppose for instance that w=10; then, $j<2^{10}=1024$, and $B^j=2^j<2^{1024}$. Further, $B^j=2^j$ is represented as $(1000 \ldots 000)_2$ in binary, with 1 at a position j. Consequently, no precomputed table is necessary. That is, it suffices to clear B to zero and write 1 at the bit position j.

Figure 5:
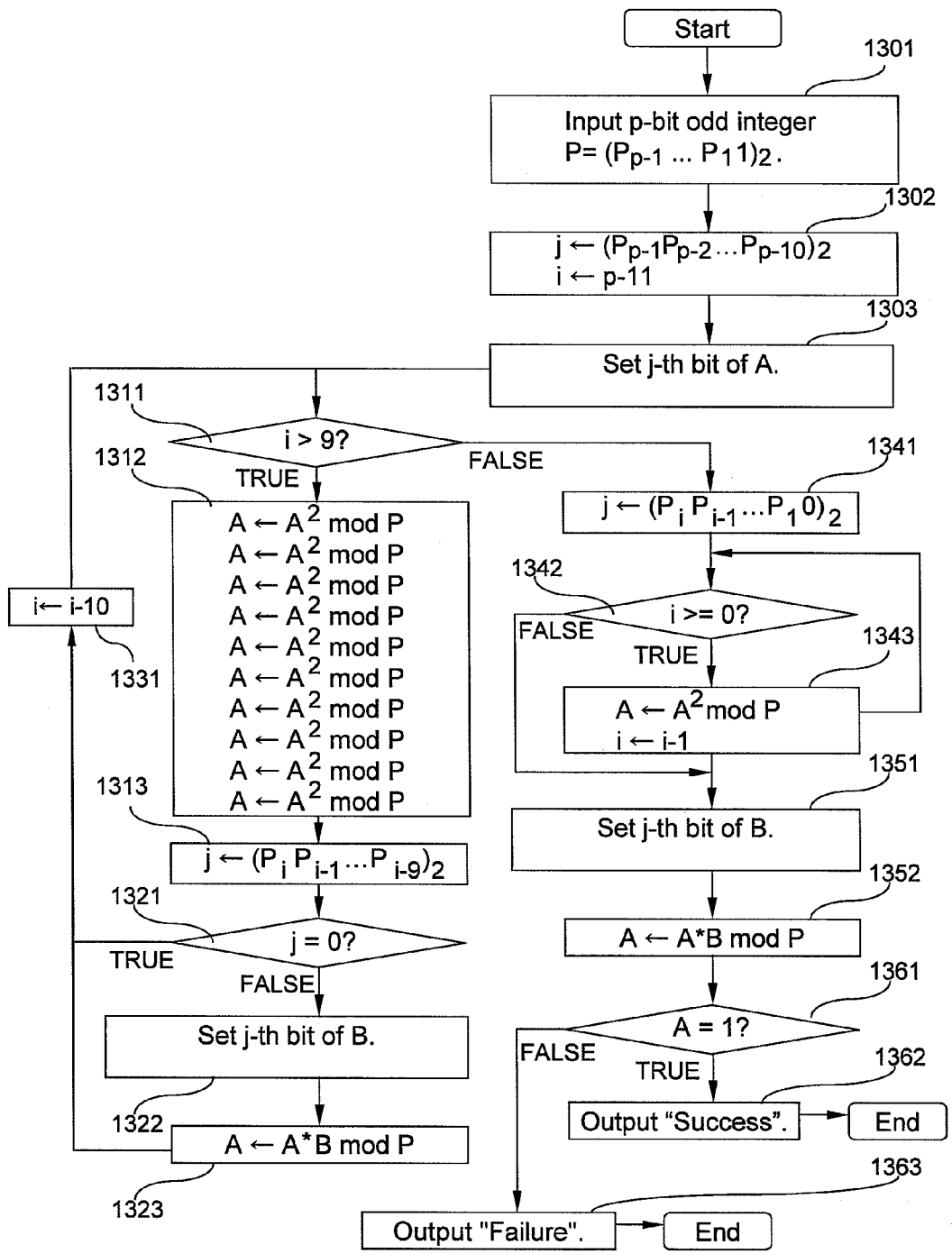
FIG. 5 is a flowchart for explanation of the function of the Fermat test control unit.

With reference to FIG. 5, this idea is explained in details, in the case where the window size is w=10.

In Step 1302, the first 10 bits of the exponent P−1 are scanned and written to the buffer j. The counter value i is initialized to p−11, which corresponds to the bit to read next, namely $P_{p-11}$. In Step 1303, the accumulator A (register A) 1121 is set to $2^j$; first 0 is written in A, and then the j-th bit of A is set to 1.

After that, the exponentiation is started. In Step 1312, 10 consecutive squares $A^2$ mod P are computed with the modular multiplication unit 1113. This is because the window size is w=10. In Step 1313, 10 consecutive bits $P_i, \ldots, P_{i-9}$ are read from the exponent P−1, where P is stored in register 1123, and the integer value $(P_i \ldots P_{i-9})_2$ is written to the buffer j. If j is zero, no multiplication is necessary and the Fermat test can continue with the next iteration. If j>0, the register B 1122 is set to $2^j$ in Step 1322: the register B 1122 is cleared to zero and then its j-th bit is set to 1. Once register B 1122 is set, the multiplication A*B mod P is executed by the modular multiplication unit 1113 in Step 1323.

Finally, in Step 1331, 10 is subtracted from the index i representing the position of the scanned bit $P_i$ in the exponent. The above steps are repeated as long as i is greater than 9, which ensures that the rightmost scanned bit $P_{i-9}$ is $P_1$ or more.

When i becomes smaller than 9, the Fermat test treats the last remaining bits separately. In Step 1341, the value of the remaining bits $(P_i \ldots P_1 0)_2$ is written to the buffer j. Note that since P is odd, P−1 is even and its least significant bit is 0. Next, i+1 squares $A^2$ mod P are computed in Step 1342, 134 with the modular multiplication unit 1113. After that, the register B 1122 is prepared for the last multiplication. That is, it is cleared to 0 and its j-th bit is set to 1 in Step 1351. As a consequence, the value $2^j$ is stored in the register B 1122 after this step. The final modular multiplication A*B mod P is computed in Step 1352.

If in Step 1361, the accumulator register A 1221 contains the value 1, the Fermat test returns "success" because P is a probable prime, and then the test is terminated. If the register A contains any other value, the test returns "failure" because P is a composite integer, and then the test is terminated.

Example of the Fermat Test

It is assumed that the integer P=1971577 is tested for primality, where the value of P is expressed in hexadecimal. In binary, P has 21 bits and P=$(111100001010101111001)_2$. The first value of j consists of the 10 most significant bits of P, namely j=$(1111000010)_2$=962. A is initialized to $2^{962}$, namely the binary value $(1000 \ldots 000)_2$ with 962 trailing zeros. The counter value i is made 10.

Next, 10 consecutive modular squares $A^2$ mod P are computed. As a result, A ends up containing the value 824444.

The next 10 bits in P−1 are j=$(1010111100)_2$=700, therefore $2^{700}$ is written to the register B, and a multiplication A*B mod P is computed, where A=824444, B=$2^{700}$ and P=1971577. The result of this multiplication is 1, which is squared once again after this.

Therefore, the final result of the exponentiation is 1, which is consistent with the fact that 1971577 is indeed a prime integer.

It is clear from this that the Fermat test required only 11 squares and 1 multiplication, which compares very well to the usual binary method, where 20 squares and 11 multiplications would have been necessary.

Consider now the integer P=1686499= $(110011011101111100011)_2$. A is initialized with $2^{823}$ since j=$(1100110111)$=823. After $A^2$ mod P is computed 10 times, A contains 129007, and the next 10 bits are j= $(0111110001)_2$=497. The value $2^{497}$ is written to B, and the multiplication A*B mod P is computed. The result of the multiplication is A=217983, which is squared one last time; the final result is 1165463, which is different from 1 and P is not a prime integer. Indeed, P=1686499=1093*1543 is a composite integer.

Miller-Rabin Test

The Miller-Rabin and Fermat test are both probabilistic primality tests: if their output is "failure", then with absolute certainty, the tested integer is a composite number. However, if their output is "success", the tested integer is just presumed to be probably a prime, but cannot be judged to be a prime with absolute certainty. For both tests, there exist many composite integers which lead to the "failure" result. However, there are composite numbers which sometimes produce "Success" as a result of the test. Fortunately, such composite numbers are rare, and there are especially very few of them in the case of the Miller-Rabin test. In particular, the 16-bit integers z which can result in such error in the Miller-Rabin test with the base of 2 are: 2047, 3277, 4033, 4681, 8321, 15841, 29341, 42799, 49141, and 52633.

Therefore, if the Miller-Rabin test returns "success" for a 16-bit integer z which is not one of the above integers, then the integer z is a prime with absolute certainty.

In essence, the Miller-Rabin test is similar to the Fermat test, but there are important differences between them. An integer targeted by the test is denoted by z, and z−1 is written as $2^{j+1}*d$, where j+1 is the number of trailing zeros in the binary representation of z−1. For the Miller-Rabin test with the base of 2, the exponentiation $x=2^d$ mod z is computed. If the result of the exponentiation is 1 or z−1, the test returns "success" and the integer z is probably a prime. If not, x is squared j times, and after each square operation, x is compared to z−1 again. If they coincide with each other, the test returns "Success". If even after the j square operations, x was never equal to z−1, the test returns "Failure" and the integer z is judged to be a composite number.

Figure 6:
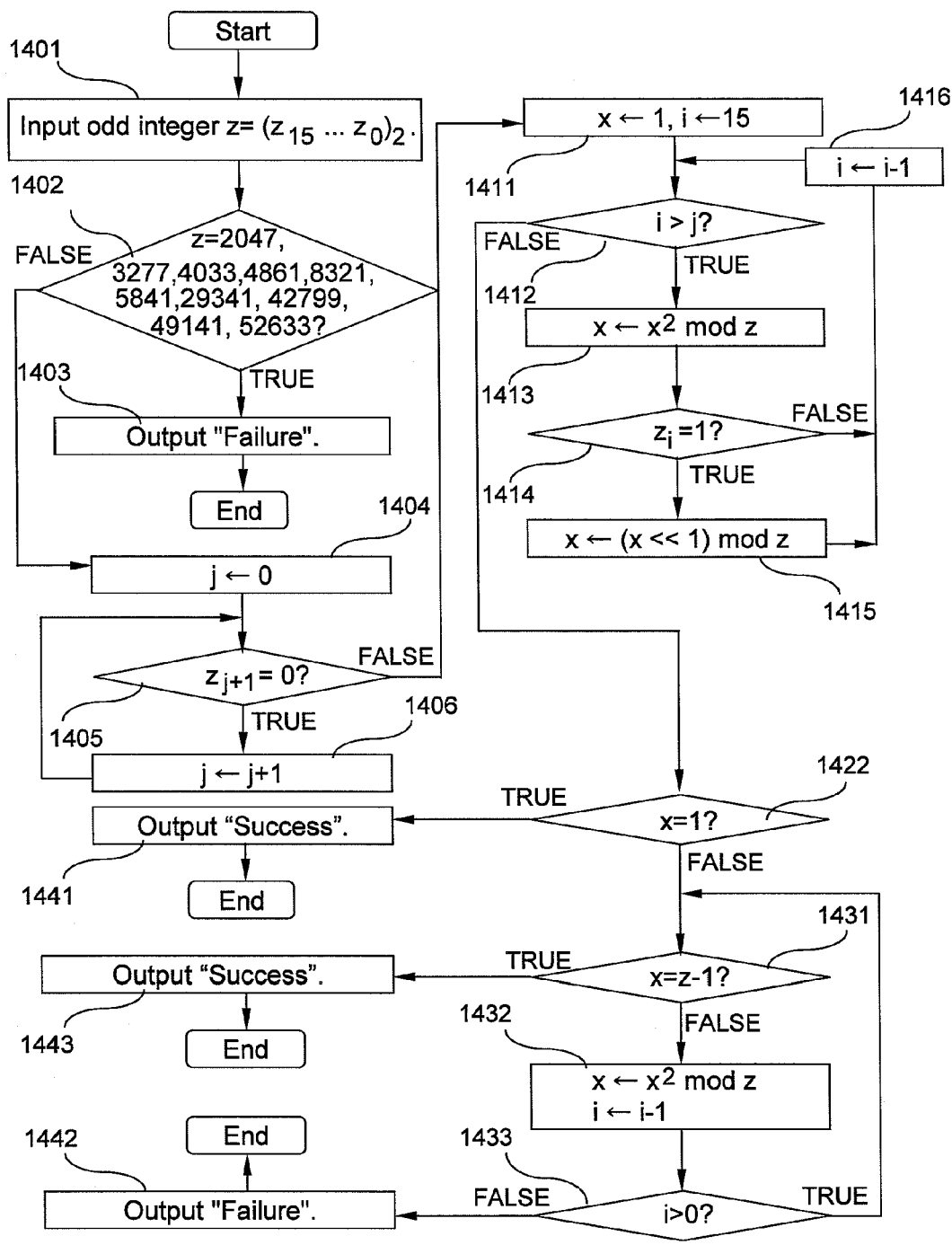
FIG. 6 is a flowchart for explanation of the function of the Miller-Rabin unit.

With reference to FIG. 6, the case where the Miller-Rabin test is applied to a primality test of a 16-bits integer $z=(z_{15} \ldots z_0)_2$ stored in register 1171 is described hereafter. If the integer z is 2047, 3277, 4033, 4681, 8321, 15841, 29341, 42799, 49141, or 52633, the integer z is judged to be a composite number and the test returns "Failure" in Step 1403. Otherwise, the number j, which is the number of trailing zeros in the binary representation of z−1, is calculated in Steps 1404 to 1406.

The exponentiation $2^d$ mod z, where $z-1=2^{j+1}*d$, is executed in Steps 1411 to 1416. The accumulator x is initialized to 1, and the loop counter value i to 15 in Step 1411. Next, while the loop counter value i is greater than j, the following steps are executed. First, a modular square $x^2$ mod z is computed in Step 1413, where x and z are 16-bit integers. After that, if a bit $z_i$ of z is 1, the operation 2*x mod z is computed in Step 1415, using a left shift x<<1, and a reduction modulo Z.

If after the exponentiation, the accumulator x contains the value 1, the algorithm stops and returns "Success" in Step 1441.

If not, x is compared with z−1 in Step 1431. If they are equal, the algorithm stops and returns "Success" in Step 1443. If not, a square $x^2$ mod z is computed in Step 1432 and the loop counter value is decreased. The above steps are repeated until the counter value i becomes 1. In the case where the accumulator was never equal to z−1, the algorithm returns "Failure" in Step 1442.

Example of the Miller-Rabin Test

It is assumed that the small prime table T 1163 stores the 17 first small primes T[0]=3, T[1]=5, T[2]=7, T[3]=11, T[4]=13, T[5]=17, T[6]=23, T[7]=29, T[8]=31, T[9]=37, T[10]=41, T[11]=43, T[12]=47, T[13]=53, T[14]=59, T[15]=61, T[16]=67. The next integer that might be a small prime is $z=69=(0000000001000101)_2$. Since z is not one of 16-bit integers that can impair the Miller-Rabin test with the base of 2, the test can be started with the computation of j, resulting from subtraction of one from the number of trailing zeros in $z-1=(0000000001000100)_2$, therefore j=1.

Next, the accumulator x is initialized to 1 and the counter value i to 15. Until i=6, the scanned bits of z−1 are all zeros, and the value of the accumulator is not corrected. In iteration i=6, x becomes 2 after a left shift in Step 1415, and is thereafter subjected to 4 squares and one left shift. As a consequence, in Step 1422, x has a value of 41. Since x is different from 1 or 68, another square is computed. Then, x becomes 25, however x is still different from 68. At this point, the test returns "Failure". This is because z=69=3*23 is expected to be a composite number.

The next odd integer is $z=71=(0000000001000111)$. In this case, j=0. Until i=6, again, x is left unchanged, namely x=1. However after one-bit left shift for i=6, x becomes 2. After that, 4 squares are computed and then x becomes 3. The subsequent one-bit shift makes x 6, and one square results in x=36. Finally, one-bit shift is computed, and then x becomes 1. As a consequence, the test is stopped in Step 1422 and the judgment is "prime" since x=1 and z=71.

Update of the Bit Array

The bit array is a well-known method inspired by the sieve of Eratosthenes for eliminating candidates $P=P_{init}+2i$ that are divisible by small primes, and are therefore composite numbers. The idea of the bit array method is roughly to compute $P_{init}$ mod z for a small prime integer z, and set B[i] as 0 in the bit array for all positions i such that $P=P_{init}+2i$ mod z=0, which means that P is divisible by z. How to write zeros at adequate positions of the bit array will be explained with reference to FIG. 7.

The input to the bit array filling unit 1132 consists of the bit array 1141, the initial candidate $P_{init}$ 1103 and a small prime z 1171. First, a buffer x is initialized with the value $P_{init}$ mod z in Step 1513. This modular reduction is easy to compute, because although $P_{init}$ is a large integer, z has only 16 bits.

Next, the bit array filling unit computes the first integer $P=P_{init}+2i$ satisfying that P is odd and P mod z=0.

If $P_{init}$ mod z=0, $P_{init}$ fulfills all conditions and the index i is set to 0 in Step 1515. Otherwise, x is not zero, and since $P_{init}=x$ mod z, then $P_{init}+z-x=0$ mod z holds.

On the one hand, if x is odd, z−x is even and $P_{init}+z-x$ is odd and satisfies all required conditions. As a consequence, in Step 1522, the value (z−x)/2 is written to the buffer i using a subtraction and a right shift (z−x)>>1.

In contrast, if x is even, $P_{init}+z-x$ is even as well, but $P_{init}+2z-x$ is odd. Therefore, in Step 1523, the value (2z−x)/2=z−x/2 is written to the buffer using a subtraction and a right shift z−x>>1.

Next, not only $P_{init}+2i$ is odd and satisfies $P_{init}+2i=0$ mod z, but also $P_{init}+2(i+z)$, $P_{init}+2(i+2z)$, $P_{init}+2(i+3z)$ and so on meet such condition. Therefore, in Step 1532, for all indices i+k*z such that i+k*z is smaller than the greatest possible index b in the array, the bit B[i] is cleared to zero. Finally, the bit array filling unit returns the bit array in Step 1551.

Example of Update of the Bit Array

In this example, the bit array 1141 has a size b=64 and the small prime table 1163 stores 16 small primes, namely T[0]=3, T[1]=5, T[2]=7, T[3]=11, T[4]=13, T[5]=17, T[6]=23, T[7]=29, T[8]=31, T[9]=37, T[10]=41, T[11]=43, T[12]=47, T[13]=53, T[14]=59, T[15]=61.

It is assumed that the input initial candidate 1103 is a 512-bit odd integer, e.g.

$P_{init}$=7256779693106507655490693859171076267003 7395884
2507405025602140952672592627402908214131 02
0642769124563905
5995711774350480838509929519895128627108485 116697.

Initially, the bit array contains only bits of 1. In other words, if B is represented as an integer, its binary representation is:

$B=(1111111111111111111111111111111111111111111111111$ $111111 111111111111111)_2$, and B consists of 64 bits. The prime generation control unit writes zeros at appropriate positions in the bit array using the small prime table T[0], . . . , T[15].

For instance, T[0]=3 and $P_{init}$ mod 3=1. One (1) is an odd number, and therefore a zero is written at position (3−1)/2=1 in the bit array, and then at positions of 1+3=4 and 4+3=7 the same thing is done. After sieving with T[0]=3, the bit array becomes:

B=(1011011011011011011011011011011011011011 011011 011011011011011)$_2$.

After iterating the procedure for all small primes in the table T, the bit array becomes:

B=(1001011000000001010011000010000001010010000 001011 001000010000010)$_2$.

It can be seen that there are only 18 bits set to 1, and therefore there are fewer indices i corresponding to integers $P_{init}$+2i which must be checked with the Fermat test. Since B[0]=1, $P_{init}$ must be checked with the Fermat test.

In the same time, the small prime generation unit 1161 looks for the next small prime. The 16-bit register z 1171 stores the last small prime in the table, namely 61. The next odd integer 63 is checked with the Miller-Rabin unit 1162, which concludes that 63 is not a prime. This is because 63=3*21. Likewise, 65 is not a prime because 65=13*5. However, the Miller-Rabin unit concludes that 67 is a prime.

After that, the bit array is updated with z=67. $P_{init}$ mod 67=24, and zero is written at a position of 67−24/2=55 in the bit array. Unfortunately, B[55] is already 0. Therefore, sieving with 67 does not yield any improvement in this example. In fact, the same holds true for the next small primes 71, 73, 79, 83, 89, 97 and 101. However, when the small prime z=103 is generated by the Miller-Rabin unit 1162, the reduction $P_{init}$ mod 103 yields 13, which corresponds to the index (103−13)/2=45. Therefore, zero (0) is written to B[45], which was previously 1. The bit array becomes:

B=(1001011000000001010011000010000001010010000 000011 001000010000010)$_2$.

The procedure can be continued as long as the Fermat test 1111 is running in Step 1222. Since the Fermat test operates on long integers (in this example 512 bits) unlike the Miller-Rabin test which operates on short integers (16 bits), many small primes can be generated while the Fermat test is running, and additional ones can be eliminated. For instance, assuming that one small prime can be generated for each 512-bit modular multiplication in the Fermat test, 512 additional small primes can be generated while the Fermat test is running. In that case, the bit array becomes:

B=(0001011000000000000000000000000001000010000 000011 000000010000000)$_2$.

As a consequence, after the first Fermat test, only 8 bits are left in the bit array.

The first Fermat test took $P_{init}$ as input. However, the result of the exponentiation $2^{Pinit-1}$ mod $P_{init}$ is not 1. Therefore $P_{init}$ is not a prime. The next non-zero entry of the bit array is B[3], and the next prime candidate will be $P_{init}$+6, namely:

P=7256779693106507655490693859171076267003739 588425074050256021409526725926274029082141310206 42769124563905599 571177435048083850 9929519895128627108485116703.

The value $P_{init}$+6 is stored in the register P 1123. The Fermat test starts the computation of $2^{Pinit+5}$ mod $P_{init}$+6. During the exponentiation, a new small prime can be generated in order to eliminate more non-zero entries in the bit array. However, in this example, even with 512 additional small primes, no more zeros are written in the array. Fortunately, the result of the second Fermat test $2^{Pinit+5}$ mod $P_{init}$+6 is 1, and indeed, $P_{init}$+6 is a prime. At this point, the prime generation unit 914 returns the value of $P_{init}$+6.

Extensions

The scope of this invention is not limited to the above embodiment. For example, the above-described system can be used on mobile phones, PDAs, and more generally any electronic devices utilizing a public key cryptosystem and having limited computational and memory resources. The type of the multiplier could be different: for instance, instead of a modular multiplication unit, a Montgomery multiplication unit can be used.

The way of reconstructing small primes is not limited to the technique described in the above embodiment. For instance, a Miller-Rabin test with a different base other than 2 may be used, or a different primality test such as the Fermat test, or any combination thereof may be used.

Similarly, a different primality test for prime candidates, such as the Miller-Rabin or Solovay-Strassen tests, can be used. Furthermore, the type of recoding is not limited to the window method, and the NAF (Non Adjacent Form) or FAN (NAF from left to right) recoding method, or any other appropriate recoding may be used instead.

Second Embodiment

Now, the description will be presented focusing on on-board cipher generation.

Portable Device

Figure 8:
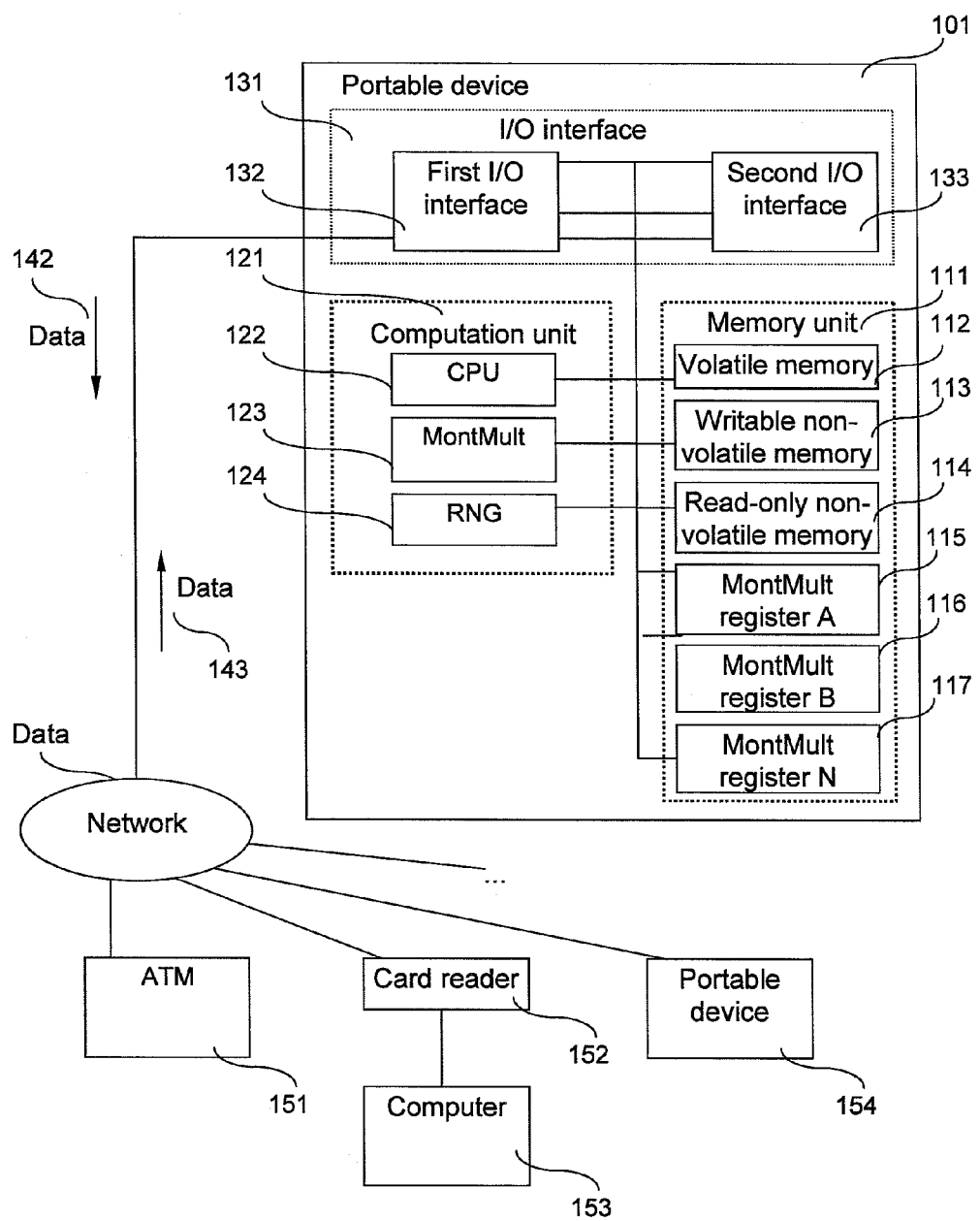
FIG. 8 is a block diagram of the portable electronic device, i.e. portable device.

The system described with reference to FIG. 8 is a portable electronic device 101, for example a smartcard with enhanced security functionalities. The portable device 101 can be coupled through a network 141 via its input/output interface unit 131, send data 142 and receive data 143. Through this network 141, the portable device 101 can communicate with electronic devices, such as an ATM 151, a computer 153 and other portable device 154. In the case where the communication channel over the network 141 is not secure, messages can be intercepted by malicious users. Therefore, security features must be supported by the portable devices. The security features include message encryption and digital signatures, and in the second embodiment, are implemented with the de-facto standard public key cryptography, namely RSA.

The portable device 101 includes three types of units: an input/output interface unit 131, a computation unit 121 and a memory unit 111.

The input/output interface unit 131 allows the portable device to be coupled to one or possibly several networks. In the second embodiment, the input/output interface unit 131 of the portable device includes two input/output interfaces 132 and 133, which can achieve contact- and contactless communications.

The computation unit 121 include a CPU 122, a Montgomery multiplier 123 and a random number generator 124. The CPU (acronym for Central Processing Unit) implements 32-bit instructions, which include memory manipulation instructions, arithmetic instructions such as addition, subtraction, multiplication and division, logical instructions such as shift, AND and OR, and control instructions. The CPU is able to execute a program containing elementary 32-bit instructions.

Typically, in RSA-related operations, very large integers of 512 bits or more are manipulated. It is not practical to implement such arithmetic operations on large integers as a program executed by the CPU 122, because the portable device has a very limited computational power. This is the reason why a portable device has a dedicated computation unit for RSA, such as a Montgomery multiplication coprocessor 123. The Montgomery multiplication coprocessor is interfaced with registers A 115, B 116 and N 117. It is assumed that the register 117 stores an n-bit odd integer N, the coprocessor computes the Montgomery multiplication $A*B*2^{-n}$ mod N or Montgomery square $A*A*2^{-n}$ mod N, where the integers A and B are stored in the registers 115 and 116, respectively.

The random number generator 124 can generate sequences of random bits, which can be used for cryptographic applications, including RSA.

The memory unit 111 includes three types memories: a volatile memory 112 for storing buffer and temporary data, a writable non-volatile memory 113 used to store user data, and a read-only non-volatile memory 114 used to store programs. The three Montgomery multiplication registers A 115, B 116 and N 117 are essentially volatile memories interfaced with the Montgomery multiplication coprocessor 123. In the second embodiment, RAM (random access memory) is used as the volatile memory, EEPROM (electrically erasable programmable read-only memory) is used as the writable non-volatile memory, and mask ROM (read-only memory) is used as the read-only non-volatile memory.

Although no special restriction is intended, it is assumed in the second embodiment that a means corresponding to the cryptographic unit 911 described in the first embodiment is materialized in a form of software. Specifically, a requisite software program is stored in e.g. the non-volatile memory 114, and e.g. the CPU 122 of the computation unit 121 runs the program, whereby the steps as shown in the flowchart to be described later are executed.

RSA Keypair Generation

Figure 9:
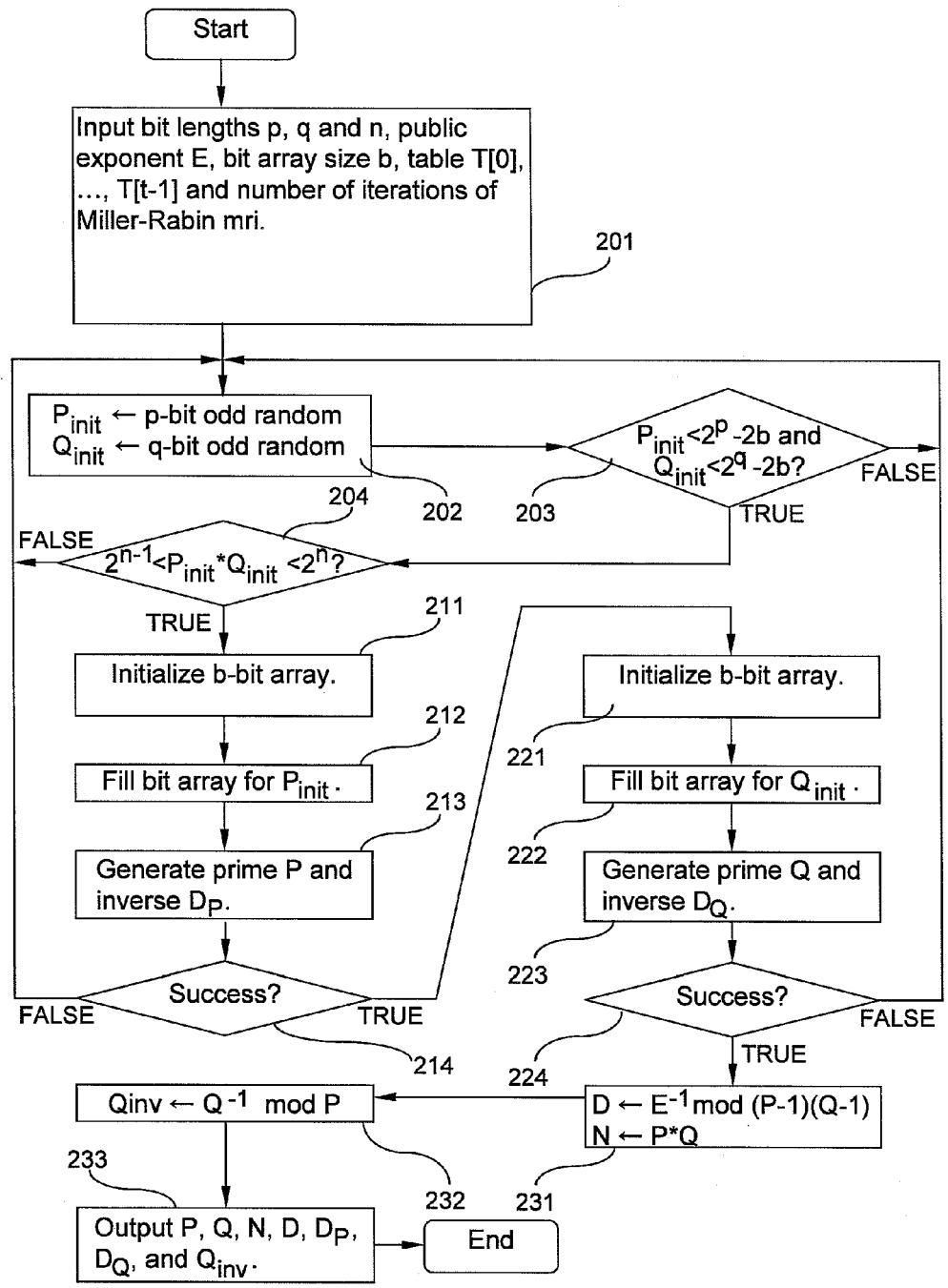
FIG. 9 is a flowchart for explanation of the RSA keypair generation function.

Before using the RSA cryptosystem on the portable device 101 for digitally signing or decrypting messages, an RSA keypair must be generated. As already described, it is advantageous to generate a keypair on a portable device. With reference to FIG. 9, this procedure will be described in detail. The input 201 for keypair generation includes:

a bit length n of a public modulus N;
a bit length p of a secret prime P;
a bit length q of a secret prime Q;
a public exponent E;
a size b of a bit array;
a predetermined table $T[0], \ldots, T[t-1]$; and
a number mri of Miller-Rabin iterations.

The role of the bit array $B[0], \ldots, B[b-1]$, the table $T[0], \ldots, T[t-1]$ and the number of Miller-Rabin iterations will be explained later. In Step 202, two initial odd random numbers $P_{init}$ and $Q_{init}$ are generated with the random number generator 124. The keypair generation procedure is to look for prime integers P and Q in the intervals $[P_{init}, \ldots, P_{init}+2(b-1)]$ and $[Q_{init}, \ldots, Q_{init}+2(b-1)]$. Therefore, Step 203 ensures that the search interval is always in the correct range, and that P and Q will have p bits and q bits, respectively. In Step 204, it is verified that the product $P_{init}*Q_{init}$ has exactly n bits. If this is true, the modulus N=P*Q has exactly n bits, too. In the case where Steps 203 or 204 fails, new initial random numbers $P_{init}$ and $Q_{init}$ are generated in Step 202.

Figure 10:
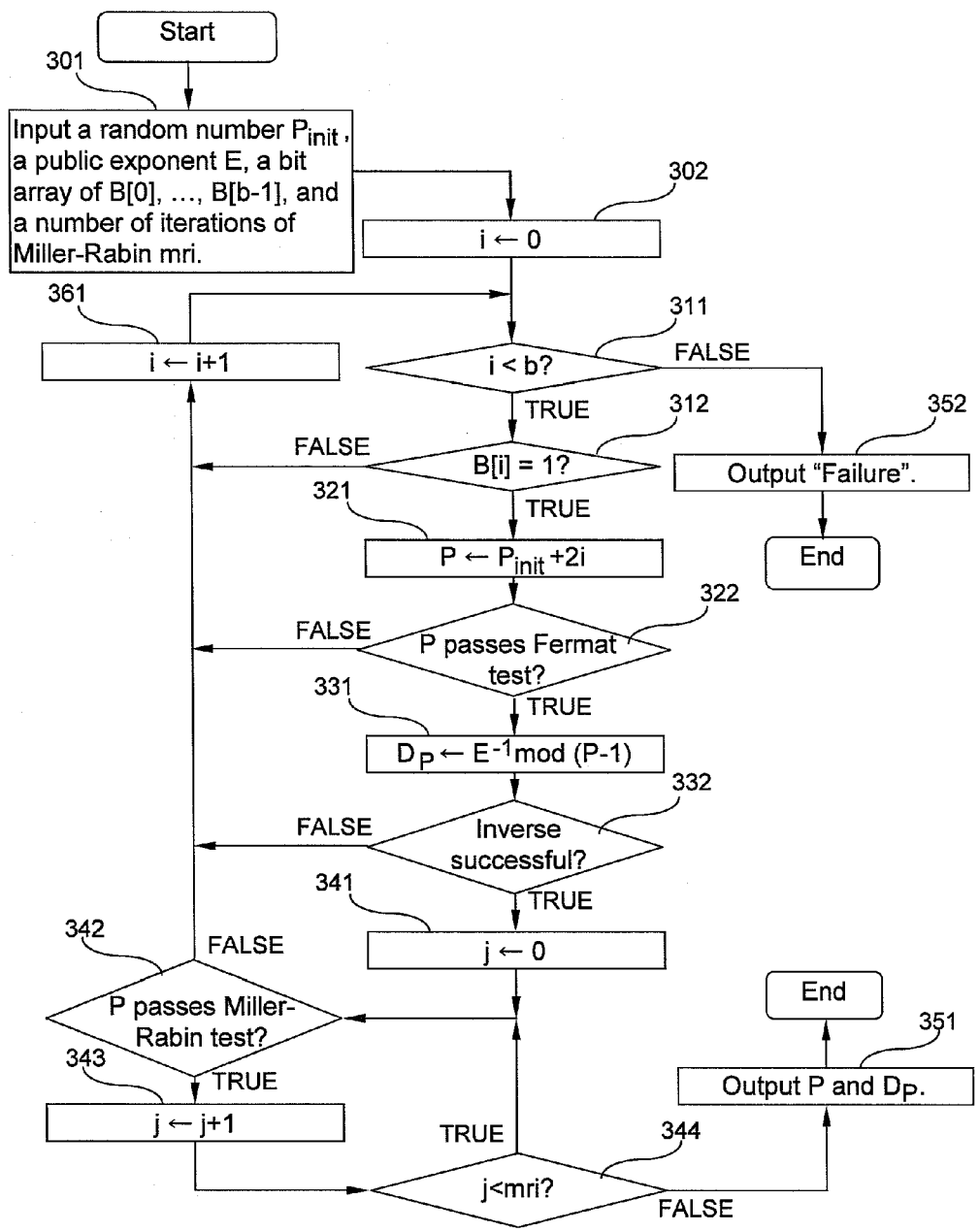
FIG. 10 is a flowchart for explanation of the prime number generation function.

Once the initial random numbers $P_{init}$ and $Q_{init}$ satisfy all required conditions, the prime generation procedure is started. A bit array of b bits $B[0], \ldots, B[b-1]$ is stored in the RAM 112, and initialized in Step 211. A bit B[i] corresponds to the integer $P_{init}+2i$. Notice that the integers $P_{init}+2i$ are all odd, since $P_{init}$ is odd and 2i is even. Indeed, the goal of the prime generation procedure is to find a prime integer in the search interval $[P_{init}, \ldots, P_{init}+2(b-1)]$. Even integers are trivially not prime and can be safely ignored. A bit B[i] set to one in the bit array corresponds to a "good" candidate, which must be further tested for primality, whereas a bit B[i] cleared to zero corresponds to a "bad" candidate which turned out not to be a prime. Initially, all candidates are set to "good" in Step 211, and in Step 212, zeros are written in the bit array for bad candidates; the steps follow a procedure described in FIG. 11. After bad candidates are eliminated in Step 212, the remaining good candidates are tested for primality in Step 213, whereby a prime P and an inverse $D_P$ such as $D_P*E=1$ mod P−1 are output, or "Failure" is returned. Step 213 will be described in detail with reference to FIG. 10. In the case where a prime P is found, the same procedure is repeated for the initial candidate $Q_{init}$ from Step 221 to Step 224. In case of failure in Step 214 or 224, new initial random numbers $P_{init}$ and $Q_{init}$ are generated in Step 202.

After two prime integers P and Q are found, a private key D satisfying $D*E=1$ mod (P−1)*(Q−1) and the public modulus N=P*Q are calculated in Step 231. The public modulus N can be computed with the Montgomery multiplication unit (which may be merely referred to as a coprocessor) 123, and the private key D can be computed with the well-known binary extended GCD algorithm described in Reference 1. The private key element of RSA-CRT $Q_{inv}$ is calculated in Step 232 based on the fact that $Q^{-1}=Q^{P-2}$ mod P since P is a prime. The exponentiation $Q^{P-2}$ mod P can be calculated using the Montgomery multiplication coprocessor 123, for example using the Montgomery exponentiation algorithm described in Reference 1.

Finally, all key elements, including the public modulus N, the private key D, the private key elements of RSA-CRT P, Q, $D_P$, $D_Q$ and $Q_{inv}$ are written to EEPROM 113 in Step 233.

Prime Generation

As in FIG. 9, in Steps 213 and 223, the prime numbers P and Q and the private key elements $D_P=E^{-1}$ mod P−1, and $D_Q=E^{-1}$ mod Q−1 are generated. The input 301 to this prime generation procedure consists of:

the initial odd random number $P_{init}$ (or $Q_{init}$);
the public exponent E;
the bit array $B[0], \ldots, B[b-1]$; and
the number of iterations mri for the Miller-Rabin test.

In Step 302, a counter value i stored in RAM 112 is initialized to 0. This counter value is used to address an element of the bit array B[i], and to represent a prime candidate $P_{init}+2i$. In Steps 311 and 312, entries of the bit array B[i] are scanned. When B[i]=1, the candidate $P_{init}+2i$ is judged to be "good" and must be further tested for primality in subsequent steps. In contrast, when B[i]=0, the candidate is judged to be "bad" and the next candidate is tested.

In Step 321, the candidate $P=P_{init}+2i$ is calculated with the CPU 122 and stored in the coprocessor register 117. Next, P is tested for primality using the Fermat test in Step 322. The Fermat test is to be described with reference to FIG. 6. If P can pass the Fermat test successfully, it is likely that P is actually a prime number.

However, P is required to satisfy an additional condition: the greatest common divisor of P−1 and the public exponent E should be 1 (gcd(P−1,E)=1), in order to ensure that the inverse $D_P=E^{-1}$ mod P−1 exists. Therefore, in Step 331, $D_P$ is calculated, using for example the binary extended GCD algorithm described in Reference 1. In the case where the procedure fails, gcd(P−1,E) is not equal to 1, P is rejected and the next candidate is tested.

Although the Fermat test is useful to quickly eliminate candidates that are composite, it is not sufficient to establish primality with good certainty. For example, there exist composites called Carmichael numbers, which can pass the Fermat test in many cases. In order to guarantee the primality of P with high probability, in the second embodiment the Miller-Rabin test is iterated several times even after P has gone through the Fermat test successfully. The number mri of iterations must be appropriately chosen. Reference 1 states that the probability that a 1024-bit random integer that can pass 3 iterations of the Miller-Rabin test successfully is not a prime is $2^{-80}$. In other words, the error probability when a candidate which can pass 3 Miller-Rabin tests is selected is $2^{-80}$, which is negligible.

Figure 14:
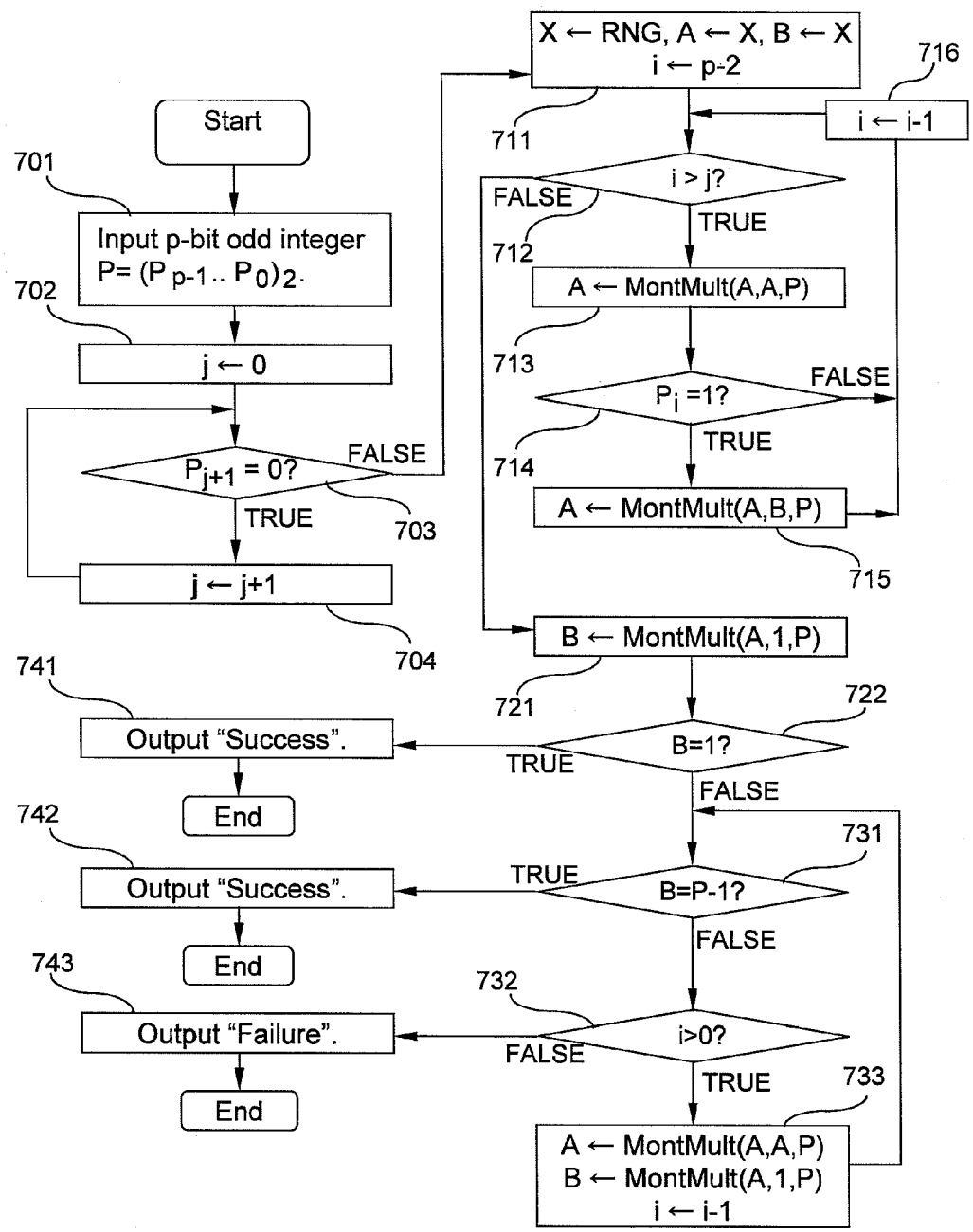
FIG. 14 is a flowchart for explanation of the function of the Miller-Rabin test.

In Step 341, a counter value j is initialized to 0 on RAM 112. As long as j is smaller than the number of iterations mri, the Miller-Rabin test, which is to be described with reference to FIG. 14, is performed in Step 342 and the counter value j is incremented by the CPU 122 in Step 343.

If P passes the Miller-Rabin test the number of times indicated by the number of iterations mri, then P is probably a prime, and is selected by the prime generation procedure, along with the inverse $D_P$ in Step 351. However, if the candidate P fails to pass any of the steps (of the check of the bit array, Fermat test, inverse calculation, and Miller-Rabin test), the counter value i is incremented in Step 361, and the next candidate $P_{init}+2i+2$ is tested. In the case where no satisfying prime has been found by the procedure for the interval $[P_{init}, \ldots, P_{init}+2(b-1)]$ the procedure results in failure in Step 352.

Bit Array

There is an optimal value for t, which is the number of small primes used for sieving bit array elements, thereby maximizing the speed of the prime generation procedure. Specifically, on one hand, with more small primes, more elements from the bit array can be sieved, which decreases the number of calls to more sophisticated primality tests, but on the other hand, using more small primes z results in more reductions in P mod z and write operations for the bit array. However, the optimal number of small primes is typically large, 1,000 or more.

When many small primes are used for sieving, a large table is necessary for storing them. For the sake of simplicity, it is assumed that each small prime can be stored in one byte (8 bits) or two bytes (16 bits), depending on the bit size of the prime. Unfortunately, there are not many 8-bit prime numbers. Therefore, most of the elements in the small prime table occupy two bytes in ROM 114. For example, if 2,048 prime numbers are used for sieving, the table occupies 4 kilo bytes in ROM 114, which is a quite large size for a smartcard.

Furthermore, the operation $P_{init}$ mod z where z is a small prime is computed with the coprocessor 123. However, z is small, whereas $P_{init}$ is large. Therefore the bit size of the Montgomery multiplication computed by the coprocessor 123 is determined by p, which is the bit size of $P_{init}$. Thus, the result of the Montgomery multiplication is MontMult$(P_{init},1, z)=P_{init}*2^{-p}$ mod z, which is different from the desired result $P_{init}$ mod z. Instead, the operation MontMult$(P_{init},2^p$ mod z, $z)=P_{init}*2^p*2^{-p}=P_{init}$ mod z should be computed.

As a consequence, a table of Montgomery constants is required, which stores all Montgomery constants $2^p$ mod z for all small prime numbers z. In the case of 2,048 small primes, this brings memory requirements to 4 kilo bytes for small primes and 4 kilo bytes for Montgomery constants. What is worse, the Montgomery constants depend on the bit length p of a prime candidate P. For instance, if the program must support 1024-bit and 2048-bit RSA, then two different tables are required for Montgomery constants.

It can be easily understood from the above description that it is necessary to use a large number of small primes for sieving. However, this approach hardly suits scarce memory resources of a smartcard. In the second embodiment, a large number of small primes are used, and yet memory requirements are reasonable, even for a smartcard. The approach for solving the problem consists of two points:

storing the difference between consecutive small primes rather than their full values; and computing the Montgomery constants $2^p$ mod z in the runtime rather than storing them.

Thanks to the first point, memory requirements for storing small primes are halved. This is because the difference between two consecutive small primes is usually small, which can be stored in one byte rather than two bytes.

Indeed, the largest difference between two consecutive primes that can be stored in one byte is $\Delta=118$, which occurs between $z_1=1,349,533$ and $z_2=1,349,651$. In other words, the difference between primes smaller than $z_1=1,349,533$ can always be stored in one byte.

The benefit of the second point is that memory requirements are totally eliminated for Montgomery constants. In addition, with an adequate scheduling, the computation of Montgomery constants, calculated by the CPU 122, can be parallelized with Montgomery multiplications MontMult $(P_{init},2^p$ mod z, z) calculated by the coprocessor 123.

Accordingly, using the approach of the second embodiment and a number of small primes of t=2,048 results in the following effects. The first is that the memory requirement for storing, in ROM 114, the table $T[0], \ldots, T[t-1]$ of differences between small primes becomes 2 kilo bytes. The second is that no speed penalty is imposed for sieving operations. The third is that important performance improvements arise from the reduction in the number of calls to costly primality tests.

Next, an example of the bit array filling procedure will be described in detail with reference to FIG. 11. The input in Step 401 consists of:

the p-bit initial odd random number $P_{init}$ (or q-bit $Q_{init}$);

the bit array $B[0], \ldots, B[b-1]$ initially filled with 1; and the table $T[0], \ldots, T[t-1]$ storing differences between consecutive small primes.

For instance, it is assumed that the table T stores information concerning small primes with respect to t=4. Then, T[0]=3 stores a first prime greater than 2, e.g. 3. T[1]=2 since the next prime is 5=3+2. T[2]=2 since the next prime is 7=5+2, and T[3]=4 since the next prime is 11=7+4.

In Step 402, two buffers z1 and r are initialized in RAM 112. The buffer z1 stores the value of the first small prime T[0] and the buffer r holds the first Montgomery constant $2^p$ mod T[0]. The computation of $r=2^p$ mod z1 is to be described with reference to FIG. 12. Next, the value of the buffer z1 is copied to the coprocessor register N 117, the value of the register r is copied to the register A 115, and $P_{init}$ is copied to the register B 116. After that, the coprocessor 123 starts computing MontMult(r, $P_{init}$, z1).

When the computations are finished, the result $P_{init}$ mod z1 is copied back to a buffer x1 in RAM 112. While the coprocessor 123 is busy with the computation MontMult (r, $P_{init}$, z1), the second small prime and its Montgomery constant are prepared by the CPU 122. The second small prime is z1+T[1], where T[1] stores the difference between the second and first primes.

In the subsequent steps, the bit array will be updated using all small primes re-generated with the table $T[0], \ldots, T[t-1]$. The table uses the counter value i for indexing its elements. The basic idea of the bit array update procedure includes the steps of:

computing $x2=P_{init}$ mod z2 with the coprocessor 123, where z2 corresponds to the active small prime with index i in the table T;

in parallel with the first step, using the CPU 122 to compute the next small prime z3 corresponding to the index i+1; and updating the bit array with $x1=P_{init}$ mod z1, where z1 is the previous small prime corresponding to the index i−1.

In Step 412, the reduction $P_{init}$ mod z2 is computed with the coprocessor 123, where z2 is the small prime corresponding to the index i. More precisely, the small prime z2 is copied to the coprocessor register 117, the Montgomery constant is copied to the coprocessor register 115, and the register 116 already stores $P_{init}$. Next, the coprocessor starts computing MontMult $(r, P_{init}, z2)$, and the result of this operation will be stored back in the buffer x2 in RAM 112.

In the same time, in Step 414, the table element T[i+1] is accessed in order to compute z3=z2+T[i+1] with the CPU 122, where z3 is the next small prime corresponding to index i+1. Its Montgomery constant $2^p$ mod z3 is computed as well. It is noted that Step 414 is skipped when i=t−1 or i=t, because the table T has only t elements.

In this situation, the bit array is updated with the value $x1=P_{init}$ mod z1, which has been calculated in the previous step i−1.

If x1=0, $P_{init}$ is divisible by z1 and zero is directly written to B[0] in Step 432.

If x1 is odd, $P=P_{init}+z1-x1$ satisfies P≡0 mod z1. In addition, $P_{init}$, x1 and z1 are odd, and therefore P is odd, too. The index j corresponding to P is j=(z1−x1)/2, which is computed in Step 422 with the CPU 122 using a right shift instead of a division by 2.

If x1 is even, $P_{init}+z1-x1$ is even and is not an element of the bit array. Instead, the next odd integer, namely $P=P_{init}+2z1-x1$ is selected. The corresponding index is calculated as j=z1−x1/2 using a right shift computed by the CPU 122 in Step 423.

When Step 422 or 423 is executed, the first index j such that $P_{init}+2j\equiv 0$ mod z1 is readily made available. But in fact, the integers $P_{init}+2j+2z1$, $P_{init}+2j+4z1$, $P_{init}+2j+6z1$ and so on, are also divisible by z1. Therefore, in Step 432, zero is written in bit B[j], and z1 is added to the index j by the CPU 122 as long as j is still in the range [0, . . . , b−1]. In that way, all odd integers $P_k=P_{init}+2*k*(j+z1)$ are present in the bit array, and $P_k$ mod z1=0 are identified as "bad" candidates.

The above procedure is repeated for all elements in the table T[2], T[3], . . . , T[t−1]. In Step 441, the values z2 and $x2=P_{init}$ mod z2 are copied to z1 and x1. In step 442 z3 is copied to z2 and the counter value i addressing an element of the table T[i] is incremented.

Computation of Montgomery Constants

Figure 11:
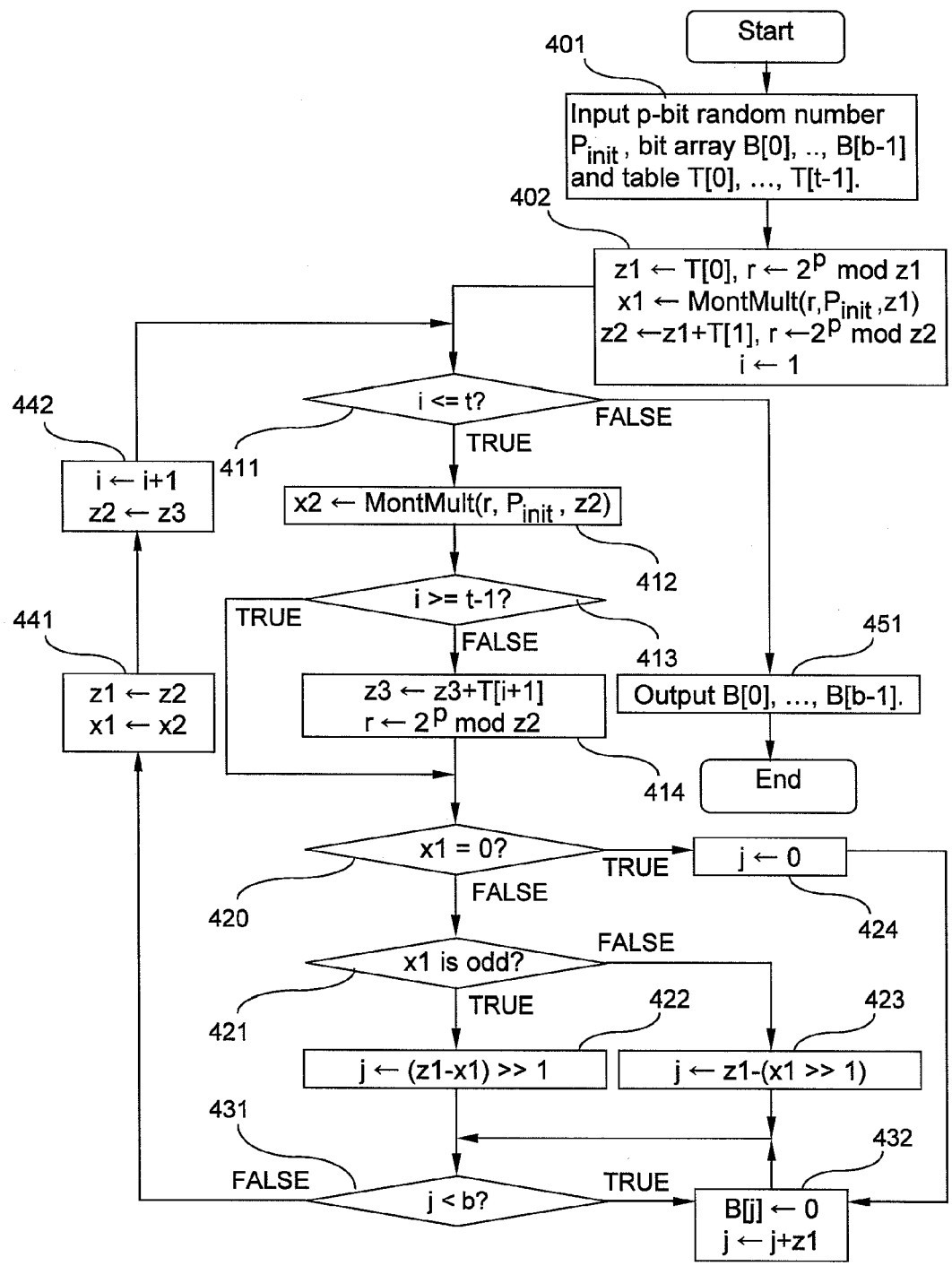
FIG. 11 is a flowchart showing an example of the bit array filling procedure.
Figure 12:
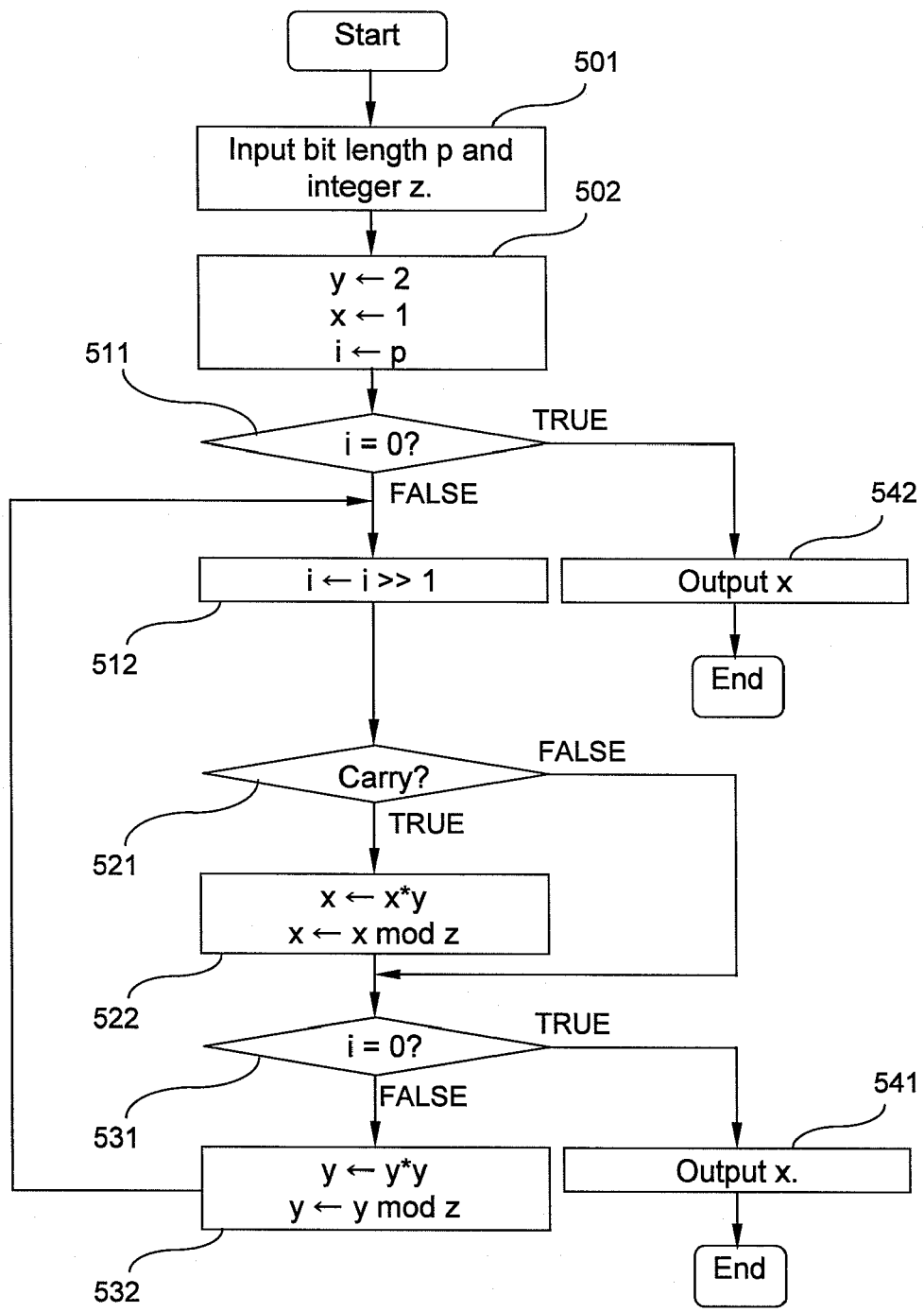
FIG. 12 is a flowchart for explanation of the function of computing Montgomery constants.

As in FIG. 11, the computation of Montgomery constants $r=2^p$ mod z associated with a small prime z is performed in Steps 402 and 414. With reference to FIG. 12, an example of this procedure will be described in detail. The input to this procedure is a bit length p of the prime candidate P, and a small prime number a. Since z is small, its bit length is typically less than 16 bits, and all operations related to the small prime number z can be easily handled by the CPU 122. The use of the Montgomery multiplication coprocessor 123 is not necessary here. As a consequence, the computation of Montgomery constants can be parallelized with coprocessor operations.

In the second embodiment, three buffers located in RAM 112 are used for the computation of Montgomery constants and initialized in Step 502. The buffer y is used for storing powers of two, x is an accumulator which stores partial results, and i is used for scanning the exponent p in the computation $2^p$ mod z. The technique used in the second embodiment is a right-to-left binary exponentiation. The basic idea includes the steps of: computing $y=2^{\wedge}(2^{\wedge}0)=2^1=2$ mod z, $y=2^{\wedge}(2^{\wedge}1)=2^2=4$ mod z, $y=2^{\wedge}(2^{\wedge}2)=2^4=16$ mod z, $y=2^{\wedge}(2^{\wedge}3)=2^8=256$ mod z and so on; scanning the binary representation of p from right to left; and when the scanned bit is 1, computing x=x*y mod z.

If p=0, x=1 is returned in Step 542. If not, i is shifted by one bit to the right using the CPU 122 in Step 512. When the least significant bit of i is 1, the right shift operation produces a carry. In that case, x is updated with x*y mod z in Step 522. In the second embodiment, the CPU does not directly support modular multiplications such as x*y mod z. Therefore, the operation is separated into two parts: one classical multiplication x*y, and one division with remainder x mod z, which are both supported by the CPU.

Next, unless the buffer i is zero, the next required power of two is computed. If it is assumed that the procedure is executing the k-th iteration, then $y=2^{\wedge}(2^{\wedge}k)$. The next required power of two is $2^{\wedge}2^{\wedge}(k+1)=2^{\wedge}(2^{\wedge}k)*2^{\wedge}(2^{\wedge}k)=y*y$ mod z, which is computed in Step 532. For this computation, one multiplication y*y and one division with remainder y mod z are used, and they are computed by the CPU 122.

Since the buffer i is shifted to the right at each iteration, eventually i becomes 0. At this point, the exponentiation $2^p$ mod z is finished, and the result $x=2^p$ mod z can be returned.

Fermat Test

With respect to elliptic curve cryptography, it is well-known that the speed of exponentiations is improved using e.g. a signed representation for the exponent, such as the Non-Adjacent Form (NAF). The NAF is faster than a simple binary exponentiation, and requires no precomputations. However, there is a major difference between elliptic curve exponentiations and RSA exponentiations. Specifically, in the former case, inverses of points can be obtained for free in terms of operation cost, whereas in the latter case, computing the inverse of some integers is very expensive. Since the computation of inverses is necessary for negative digits in a signed representation, this approach is usually considered a dead end for RSA.

Despite the fact that they are usually not attractive for RSA, in the second embodiment such a signed exponentiation is used for the Fermat test. Indeed, $A*B^{-1}$ mod P is a very expensive operation in general. However, if B=2, then the operation becomes A/2 mod P. Furthermore, a division by 2 is a simple right shift, which is possibly preceded by an addition with P. In short, if A is even, A>>1, that is a one-bit right shift is performed. If A is odd, (A+P)>>1, that is a one-bit right shift is conducted.

Since the NAF recoding is performed from right to left and exponentiations from left to right, the two processes cannot be combined. Specifically, first, the exponent is recoded and its new representation is stored in a different RAM area. Second, the exponentiation is computed. The drawback of this approach is that the exponent is quite large, and some region in RAM must be reserved for storing its recoded form, which is in any case larger than the original exponent. If the recoding and exponentiation were both performed from left to right, there would be no need to allocate a region of RAM for storing the new representation. This is because the two processes could be combined in one.

The Fermat test in the second embodiment achieves the following effects: the recoding and exponentiation are combined in one unique phase, and therefore no additional memory is necessary for storing the recoded exponent. To achieve this, the Fermat test utilizes the FAN representation, which is normally used with elliptic curves. The description about elliptic curves is presented by, for instance, —Katsuyuki Okeya, "Signed Binary Representations Revisited", Proceedings of Advances in Cryptology, CRYPTO 2004, LNCS 3152, Springer-Verlag, 2004, where it is called wMOF. FAN is similar in nature to NAF. However, FAN recoding is performed from left to right, and can be combined with the exponentiation phase.

In one iteration in a FAN exponentiation, at most three consecutive bits of the exponent: $P_{i+1}$, $P_i$ and $P_{i-1}$ are scanned. Its details can be classified into the following Cases 1 to 6.

[Case 1] $(P_{i+1}P_i)=(11)_2$ is recoded as $(S_i)=(0)$ and i is set to i−1.

[Case 2] $(P_{i+1}P_iP_{i-1})=(011)_2$ is recoded as $(S_iS_{i-1})=(1)$ and i is set to i−1.

[Case 3] $(P_{i+1}P_iP_{i-1})=(010)_2$ is recoded as $(S_i)=(01)$ and i is set to i−2.

[Case 4] $(P_{i+1}P_i)=(00)_2$ is recoded as $(S_i)=(0)$ and i is set to i−1.

[Case 5] $(P_{i+1}P_iP_{i-1})=(100)_2$ is recoded as $(S_iS_{i-1})=(-1)$ and i is set to i−1.

[Case 6] $(P_{i+1}P_iP_{i-1})=(101)_2$ is recoded as $(S_i)=(0-1)$ and i is set to i−2.

In Cases 1 and 4, one square is computed with the coprocessor 123. In Case 2, one square is computed with the coprocessor 123, and one left shift with the CPU. In Case 5, one square is computed with the coprocessor 123, and one right shift with the CPU. In Case 3, two squares are computed with the coprocessor 123 and one left shift with the CPU. In Case 6, two squares are computed with the coprocessor 123 and one right shift with the CPU.

Figure 13:
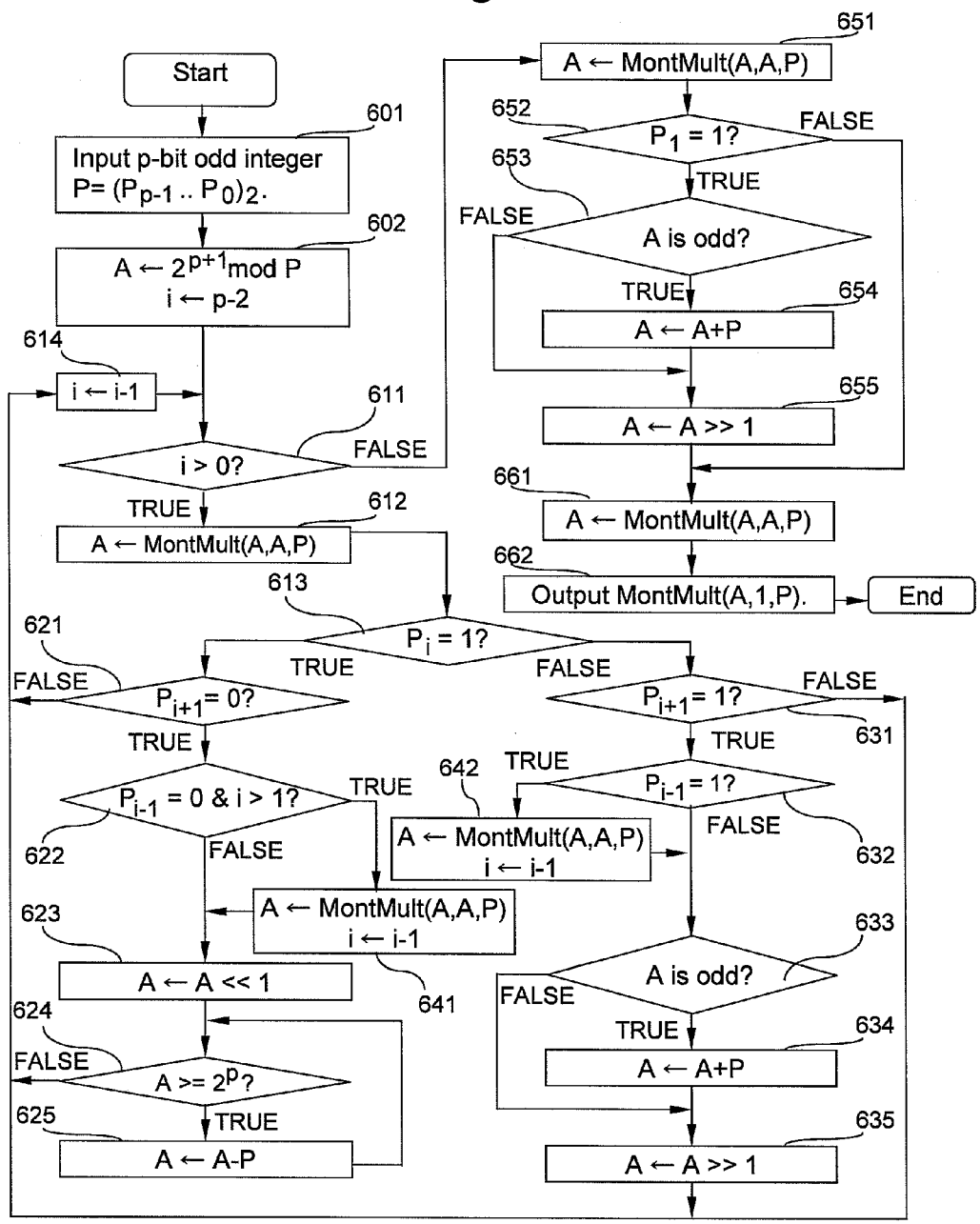
FIG. 13 is a flowchart for explanation of the function of the Fermat test.

Now, the details thereof will be described with reference to FIG. 13. The input to the Fermat test in Step 601 consists of a p-bit odd integer P, which is targeted by the primality test. In the smartcard memory 112, P is stored as a sequence of p bits of $(P_{p-1} \ldots P_0)_2$. Since the Montgomery multiplication coprocessor calculates $MontMult(A,A,P)=A*A*2^{-p} \bmod P$, the coprocessor register A 115 is initialized with not 2, but $2*2^p \bmod P$.

In this way, $MontMult(A,A,P)=2*2*2^{2p}*2^{-p}=2*2*2^p \bmod P$ holds.

It can be seen that the factor $2^p$ is still present even after the Montgomery multiplication. In Step 602, the coprocessor register 115 is initialized with $2^{p+1} \bmod P$. The reason for this is that p is not very large, and typically p=512 or p=1024. In binary, $2^{p+1}$ is simply represented with 1 and p+1 0's subsequent to it. Next, P is subtracted as many times as required until $2^{p+1}$ becomes smaller than P. In addition, the counter value i is initialized to p−2 on RAM 112.

In all of Cases 1 to 6, a square is always computed; therefore, a Montgomery square is computed in Step 612. More precisely, the coprocessor register A 115 is updated with the Montgomery square $MontMult(A,A,P)$, where the input prime candidate P is stored in the coprocessor register N 117. Next, there are different patterns depending on the value of bits of P, where each pattern corresponds to one of Cases 1, 2, 3, 4, 5 and 6. First, the value of the i-th bit of P, namely $P_i$, is checked in Step 613, where P is stored in the coprocessor register 117 and the counter value i is in RAM 112. If $P_i=1$, the operations related to one of Cases 1, 2 and 3 must be executed. If $P_i=0$, the operations related to one of Cases 4, 5 and 6 must be executed.

If $P_i=1$, the value of the bit $P_{i+1}$ is checked in Step 612. The details of the check are as follows.

[Case 1] If $P_{i+1}=0$, then a bit processing associated with Case 1 which has been detected is performed. Since Case 1 requires the computation of one Montgomery square only, no further instructions are necessary and the value of the next bit is checked. If $P_{i+1}=0$, bit $P_{i-1}$ must be checked in order to distinguish between Cases 2 and 3. Therefore, in Step 622, the value of bit $P_{i-1}$ is checked.

[Case 2] If $P_{i-1}=0$, a bit processing associated with Case 2 which has been detected is performed. Therefore, in Step 623, the data in coprocessor register A 115 is shifted by one bit to the left by the CPU 122. After the shift operation, the data in A 115 might have more than p bits. In this case, P must be subtracted from A as many times as required in Step 625.

[Case 3] If $P_{i-1}=1$, a bit processing associated with Case 3 has been detected is performed. Another Montgomery square is computed in Step 641, and the counter value i is decreased one more time. After that, the data in coprocessor register A 115 is shifted by one bit to the left in Step 623, and P is subtracted from A if A has more than p bits in Step 625. However, if i=1, the bit sequence associated with Case 2 is executed instead. If $P_i=0$, the value of bit $P_{i+1}$ is checked in Step 631. The details of the check are as follows.

[Case 4] If $P_{i+1}=0$, no further operation is necessary. If $P_{i+1}=1$, $P_{i-1}$ must be checked in order to distinguish between Cases 5 and 6.

[Case 5] If $P_{i-1}=0$, A is shifted by one bit to the right. If A is even, its least significant bit is 0 and A can be directly shifted by the CPU 122 in Step 635. But if A is odd, P is added to A by the CPU 122 in Step 634. Since both of A and P are odd, A+P is even, and A can be shifted to the right in Step 635.

[Case 6] If $P_{i-1}=1$, a Montgomery square is computed and the counter value i is decremented in Step 642. Then, a right shift is computed following Step 633.

The above steps are iterated and the counter value i decremented in Step 614, until i becomes 0. The two least significant bits of P−1 are treated independently. The penultimate bit of P−1 is $P_1$. If $P_1=0$, a Montgomery square is computed in Step 651. If $P_1=1$, the Montgomery multiplication is followed by a right shift in Step 655, after addition of P in Step 654 if required. The last bit of P−1 is always 0 since P−1 is even, and therefore a Montgomery square is computed in Step 661. At this point, all bits have been computed, but the Montgomery constant $2^p \bmod P$ must be removed. Therefore, in Step 663, the data 1 is written to the coprocessor register B 116, and a Montgomery multiplication $MontMult(A,1,P)=A*2^{-p} \bmod P$ is calculated by the coprocessor 123. This last multiplication will cancel out the Montgomery constant $2^p \bmod P$ and the data stored in the coprocessor register A is returned in Step 662. If A is 1, P is probably a prime. If A is not 1, P is composite.

Example of the Fermat Test

In this example, it is assumed that the integer P=109 is tested for primality. The exponentiation $2^{108} \bmod 109$ is computed using the Fermat test, which has been explained with reference to FIG. 13. In binary, $108=(1101100)_2$, and therefore the usual Fermat test with left shifts based on the binary method would compute 3 left shifts. This is because there are 3 digits of 1 in addition to the most significant bit of 1. On the other hand, the FAN representation of 108 is 108=(100−10−100), and there are only two right shifts.

Now, the detailed description will be presented. The bit length of P=109 is p=7. First, A is initialized with $2^{p+1} \bmod P=2^8 \bmod 109$. This is because $2^8=256$, and $2^8-2*109=38$, register A=38, and the counter value i contains p−2=5.

In the case of [i=5], register A is updated with $MontMult(A,A,P)=MontMult(38,38,109)=76$. Next, $P_5=1$, $P_6=1$ and the corresponding recoding is 0, therefore no further operation is necessary.

In the case of [i=4], register A is updated with MontMult(76,76,109)=86. Next, $P_4=0$, $P_5=1$, $P_3=1$ and the corresponding recoding is 0-1. The register A is updated with MontMult(86,86,109)=68 and the counter value i is decremented. Since 68 is even, the right shift A>>1 can be performed directly, and register A is updated with 34.

In the case of [i=2], A is updated with MontMult(34,34,109)=101. Next $P_2=1$, $P_3=1$ and the corresponding recoding is 0.

In the case of [i=1], A is updated with MontMult(101,101, 109)=55. Next, $P_1=0$, $P_2=1$, $P_0=0$ and the corresponding recoding is −1. The register A is odd, therefore 109 is added to A, and a right shift is computed. Thus A=82.

From there, the final steps of the Fermat test are executed. Since $P_1=0$, two Montgomery squares are computed. Specifically, MontMult(82,82,109)=90, and MontMult(90,90, 109)=19. Since MontMult(19,1,109)=1, the Fermat test outputs 1, which is consistent with the fact that 109 is a prime integer.

Miller-Rabin Test

In the Miller-Rabin test, P−1 is written as $2^{j+1}*D$, where j+1 is the number of trailing zeros in the binary representation of P−1. First, for some base B, the exponentiation $B \leftarrow X^D$ mod P is computed. If $X^D$ mod P=1, then P is probably prime. On the other hand, if $B=X^D$ mod P is not 1, then B is compared with −1. If B is not −1, B is squared j times, and after each square, is compared to −1 again. If after one of these squares, B=−1, the Miller-Rabin test stops and concludes that P is probably a prime. If not, P is a composite number.

As in the Fermat test, the input to the Miller-Rabin test consists of a p-bit odd integer $P=(P_{p-1} \ldots P_0)$ in Step 701. The counter value j, located in RAM 112, stores the number of trailing zeros minus one. In Steps 703 and 704, the least significant bits of P are scanned until a bit set to 1 is found. For each zero, j is incremented by the CPU.

Once j has been determined, the base of the exponentiation is randomly selected in Step 711. The random number generator 124 generates a p-bit random integer X, which is stored in the coprocessor register A 115 and copied in the coprocessor register B 116 as well. A counter value i is initialized to p−2 in RAM 112. This counter value i will indicate which bit of P−1 is scanned while the exponentiation $B^D$ mod P is computed in subsequent steps. The exponentiation is computed with a sequence of Montgomery squares and Montgomery multiplications, using the left-to-right binary method. In Step 713, a Montgomery square is computed and the result is stored in coprocessor register 115. Specifically, MontMult(A,A,P)=$A*A*2^{-p}$ mod P is stored. In addition, if bit $P_i$ is 1, a Montgomery multiplication is computed in Step 715. That is, MontMult(A,B,P)=$A*B*2^{-p}$ mod P is computed. Finally, in Step 716, the counter value i is decremented.

Since the Montgomery multiplication coprocessor 123 is used in Steps 713 and 715, a factor $2^{-p}$ mod P is produced after each multiplication or square. However, if we call X the initial random bits X generated in Step 711, X can be regarded as $X=Y*2^p$ mod P, where Y is another p-bit integer. Now, MontMult(Y,Y,P)=$Y*Y*2^p$ mod P, and the factor $2^p$ mod P is stable after Montgomery multiplications. Therefore, the result of the exponentiation is not $X^D$ mod P but $X^D*2^p$ mod P. However, $X^D$ mod P can be recovered easily in Step 721, provided that the result of the previous steps is multiplied with 1 using the Montgomery multiplication coprocessor:

MontMult($A$,1,$P$)=$Y^D*2^p*1*2^{-p}$ mod $P$=$Y^D$ mod $P$.

If after Step 721, the coprocessor register A 115 stores the data 1, the Miller-Rabin test outputs "Success" in Step 741. If not, the data stored in the coprocessor register A 115 is squared and compared with −1 as explained previously.

The Montgomery square operation is repeated j times in Step 733. After one Montgomery square, register A is storing $Y^{2D}*2^p$ mod P. Therefore, it can be seen that the factor $2^p$ mod P is stable after Montgomery multiplications that is, the factor does not change. However, since the result of the Montgomery square is compared with −1, the factor $2^p$ must be removed in Step 733 with the operation MontMult(A,1,P)=$Y^{2D}$ mod P, and the resulting data is stored in coprocessor register B 116. Notice that −1=P−1 mod P, therefore, in Step 731, the data stored in coprocessor register B is compared with P−1. If they match, the Miller-Rabin test outputs "Success" in Step 742 since P is probably a prime. If the data in register B is different from P−1, the procedure described above is reiterated j times in total. If after j times reiteration, the value of register B was never equal to P−1, the Miller-Rabin test outputs "failure" in Step 743 since P is composite.

Extensions

The scope of this patent is not limited to the above embodiment. For example, the portable device as shown in FIG. 8 could be a mobile phone, a PDA, and more generally any electronic device utilizing a public key cryptosystem and having limited computational and memory resources. In particular, the portable device does not need to be equipped with a Montgomery multiplication coprocessor. A different type of coprocessor may be present, for instance a classical modular multiplication coprocessor. Alternatively, modular multiplications may be computed by the CPU, without any coprocessor.

Instead of storing the difference between small primes, any other appropriate method for reconstructing small primes may be used and falls in the scope of this patent.

The recoding in the Fermat test may be a different recoding, such as the NAF method, the window or sliding window method.

Although the second embodiment focuses on the generation of RSA keys, the scope of our patent is not limited to RSA; other public key cryptosystems such as DSA or Diffie-Hellman can also take advantage of the invention in order to efficiently generate primes.

In addition, the scope of our patent is not limited to the organization or type of primality tests. For instance, the Miller-Rabin test may be used in place of the Fermat test, or a different primality test such as the Frobenius, Solovay-Strassen or AKS tests. The scope of our patent is not limited to a particular type of RSA parameters. For example, CRT parameters such as $D_P$, $D_Q$ and $Q_{inv}$ could be omitted, or D may be omitted, or strong primes could be used with additional conditions on P and Q.

The cryptographic unit as described with reference to FIG. 1 in the first embodiment can be actualized by means of a software program. Also, the function achieved by the structure as shown in FIG. 8 can be constructed by a hardware logic.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A data processing system for testing the primality of a first integer, comprising:
   a first memory unit to store a second integer;
   a recoding unit to generate a new representation of the first integer;
   a bit manipulation operation unit;
   a modular multiplication unit;
   a loop control unit; and
   a decision unit to decide the primality or compositeness of the first integer,
   wherein the recoding unit scans a plurality of bits of the first integer and recodes the first integer to a base $2^w$ representation, provided that 'w' is a positive integer,
   wherein the bit manipulation operation unit processes a bit manipulation operation on the second integer based on the scanned bits, and wherein the bit manipulation operation comprises:
an operation to clear all bits of the second integer to zero,
an operation to select one bit of the second integer based on the base $2^w$ representation of the first integer, and
an operation to set the selected one bit to one,
wherein the modular multiplication unit calculates at least one modular multiplication based on the second integer, and
wherein the modular multiplication unit calculates power of two modulo the first integer.

2. The data processing system according to claim 1, comprising a second memory unit to store a third integer, wherein the modular multiplication unit calculates a plurality of modular squares of the third integer and multiplies the second integer by the third integer.

3. A data processing system for testing the primality of a first integer, comprising:
a first memory unit to store a second integer;
a recoding unit to generate a new representation of the first integer;
a bit manipulation operation unit;
a modular multiplication unit;
a loop control unit; and
a decision unit to decide the primality or compositeness of the first integer,
wherein the recoding unit scans a plurality of bits of the first integer,
wherein the bit manipulation operation unit processes a bit manipulation operation on the second integer based on the scanned bits, and
wherein the bit manipulation operation comprises:
at least one left shift operation of the second integer when the new representation of the first integer is a positive number; and
at least one right shift operation of the second integer when the new representation of the first integer is a negative number,
wherein the modular multiplication unit calculates at least one modular multiplication based on the second integer, and
wherein the modular multiplication unit is a Montgomery multiplication unit and calculates power of two modulo the first integer.

4. The data processing system according to claim 3, wherein the recoding unit recodes the first integer to its NAF representation.

5. The data processing system according to claim 3, wherein the recoding unit recodes the first integer to its FAN representation.

* * * * *